United States Patent
Inami et al.

(10) Patent No.: US 9,400,522 B2
(45) Date of Patent: Jul. 26, 2016

(54) MULTIPLE DISPLAY PORTABLE TERMINAL APPARATUS WITH POSITION-BASED DISPLAY MODES

(75) Inventors: Akiko Inami, Gifu (JP); Naoya Watanabe, Gifu (JP)

(73) Assignee: KYOCERA Corporation, Kyoto (JP)

(*) Notice: Subject to any disclaimer, the term of this patent is extended or adjusted under 35 U.S.C. 154(b) by 208 days.

(21) Appl. No.: 13/457,144

(22) Filed: Apr. 26, 2012

(65) Prior Publication Data

US 2012/0274540 A1 Nov. 1, 2012

(30) Foreign Application Priority Data

Apr. 26, 2011 (JP) .................. 2011-097915

(51) Int. Cl.
| | |
|---|---|
| G09G 5/00 | (2006.01) |
| G06F 1/16 | (2006.01) |
| G06F 3/14 | (2006.01) |
| H04M 1/02 | (2006.01) |

(52) U.S. Cl.
CPC ............ *G06F 1/1641* (2013.01); *G06F 1/1616* (2013.01); *G06F 3/1438* (2013.01); *H04M 1/0214* (2013.01); *H04M 1/0245* (2013.01); *G06F 1/1624* (2013.01); *G06F 1/1677* (2013.01); *G06F 2200/1614* (2013.01); *G09G 2354/00* (2013.01); *H04M 1/0235* (2013.01); *H04M 2250/12* (2013.01); *H04M 2250/16* (2013.01)

(58) Field of Classification Search
CPC ... G06F 3/1423; G06F 3/1431; G06F 3/1438; G06F 1/1616; G06F 2200/1614; G06F 1/1624; G06F 1/1677; G06F 1/1641; H04M 1/0214; H04M 1/0245; H04M 1/0235; H04M 2250/16; H04M 2250/12; G09G 2354/00
USPC ........................................................ 345/1.1
See application file for complete search history.

(56) References Cited

U.S. PATENT DOCUMENTS

| | | | |
|---|---|---|---|
| 5,900,848 A | 5/1999 | Haneda et al. | |
| 6,151,081 A | 11/2000 | Gold et al. | |
| 8,337,304 B2 | 12/2012 | Yoshino et al. | |

(Continued)

FOREIGN PATENT DOCUMENTS

| | | |
|---|---|---|
| JP | 09-305262 A | 11/1997 |
| JP | H09-305259 A | 11/1997 |

(Continued)

OTHER PUBLICATIONS

An Office Action; "Notice of Reasons for Rejection," issued by the Japanese Patent Office on Sep. 9, 2014, which corresponds to Japanese Patent Application No. 2011-097915 and is related to U.S. Appl. No. 13/457,144; with English language concise explanation.

*Primary Examiner* — Jimmy H Nguyen
*Assistant Examiner* — Yaron Cohen
(74) *Attorney, Agent, or Firm* — Studebaker & Brackett PC

(57) ABSTRACT

A portable terminal apparatus is provided, which includes a first cabinet having a first display surface, a second cabinet having a second display surface, a support mechanism which supports the first and second cabinets to be switchable between first and second arrangement states which are different in a relative position between the first and second display surfaces, and a control unit which controls a display mode of the first and second display surfaces according to the switching between the first and second arrangement states.

15 Claims, 16 Drawing Sheets

(56) References Cited

U.S. PATENT DOCUMENTS

| | | |
|---|---|---|
| 2003/0133515 A1 | 7/2003 | Kondo |
| 2007/0178952 A1 | 8/2007 | Ehara et al. |
| 2007/0291041 A1 | 12/2007 | Nakai et al. |
| 2008/0148184 A1 | 6/2008 | Davis |
| 2009/0298550 A1 | 12/2009 | Kang et al. |
| 2010/0007603 A1* | 1/2010 | Kirkup .................. 345/158 |
| 2010/0079672 A1 | 4/2010 | Bae et al. |
| 2010/0085382 A1* | 4/2010 | Lundqvist et al. ............ 345/659 |
| 2010/0156913 A1* | 6/2010 | Ortega et al. ................. 345/520 |
| 2010/0259463 A1 | 10/2010 | Sip et al. |
| 2010/0259515 A1 | 10/2010 | Kohara |
| 2010/0321275 A1* | 12/2010 | Hinckley et al. ............... 345/1.3 |
| 2011/0012931 A1 | 1/2011 | Abe |
| 2011/0187646 A1 | 8/2011 | Mahmoud |
| 2011/0254774 A1 | 10/2011 | Yamamoto et al. |
| 2012/0001829 A1* | 1/2012 | Anttila et al. .................. 345/1.1 |
| 2012/0060089 A1 | 3/2012 | Heo et al. |
| 2012/0098773 A1 | 4/2012 | Kobayashi et al. |

FOREIGN PATENT DOCUMENTS

| | | |
|---|---|---|
| JP | 2003-158573 A | 5/2003 |
| JP | 2006-209560 A | 8/2006 |
| JP | 2011-227698 A | 11/2011 |

* cited by examiner

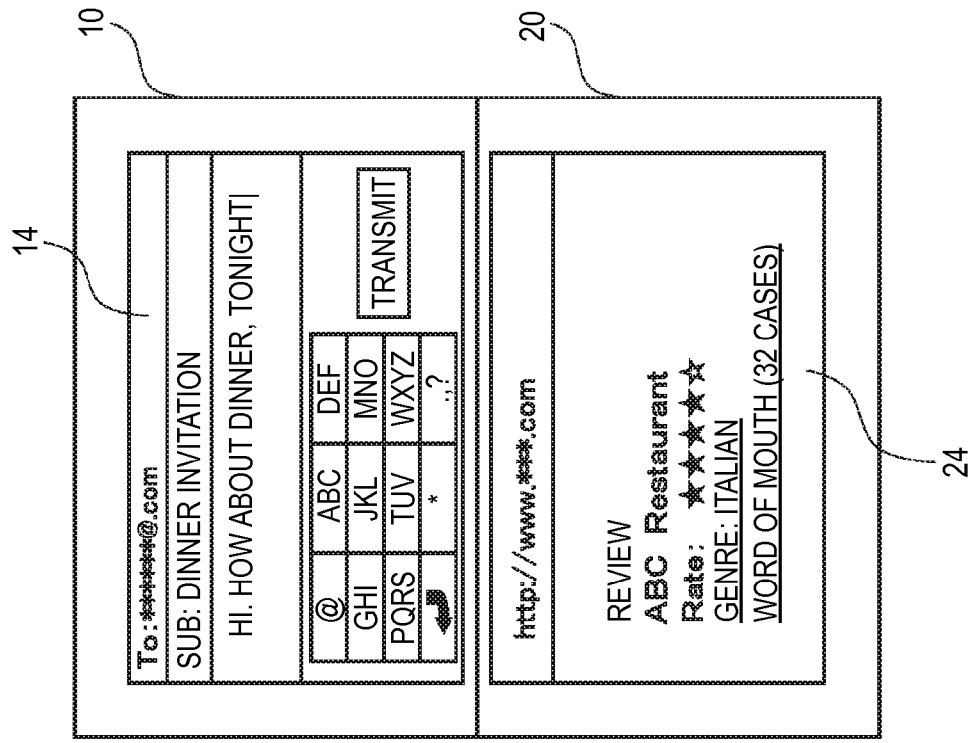
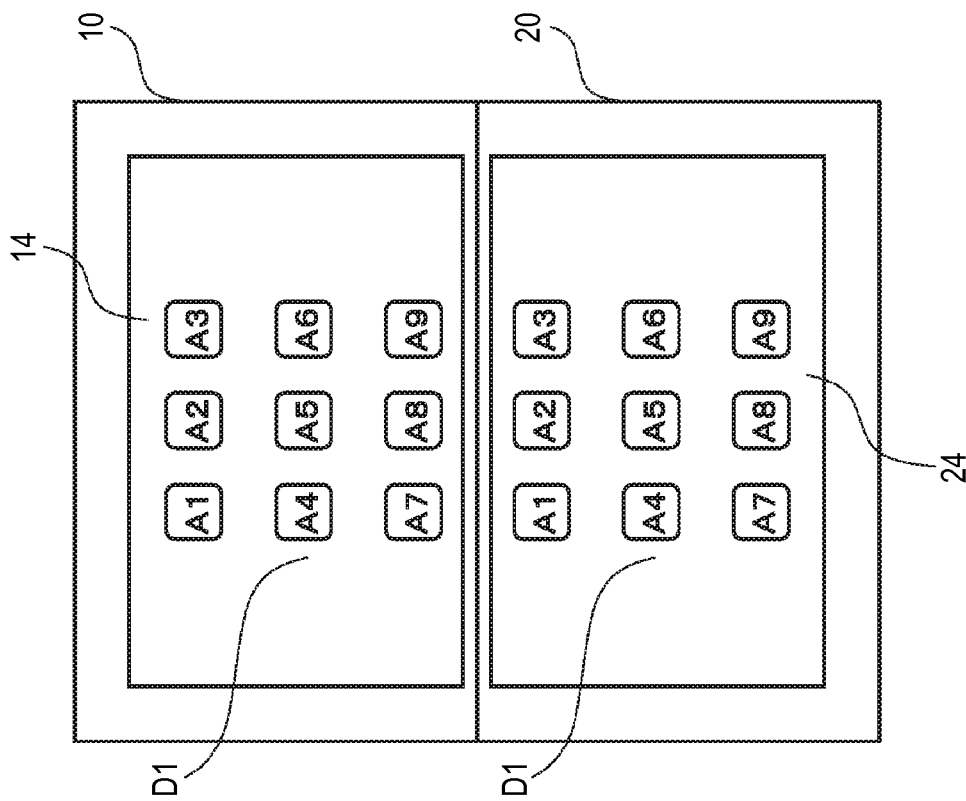

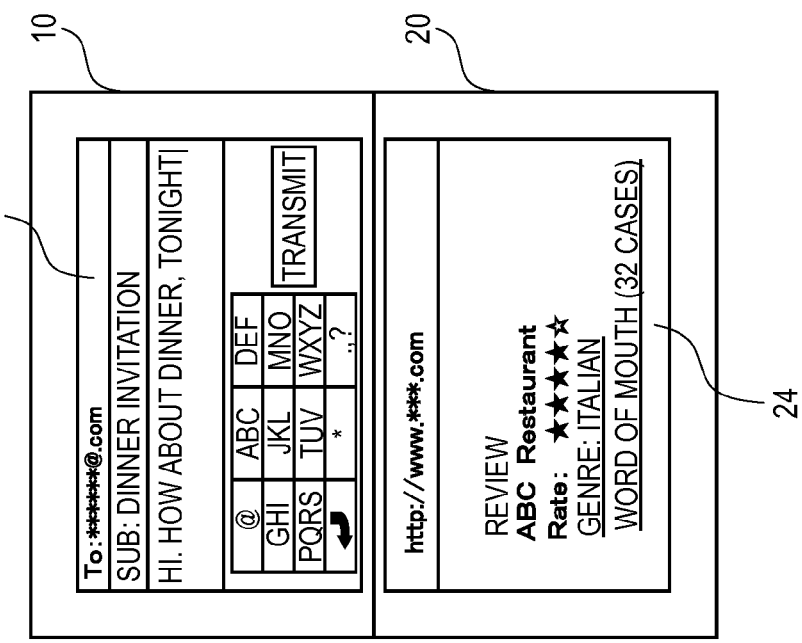
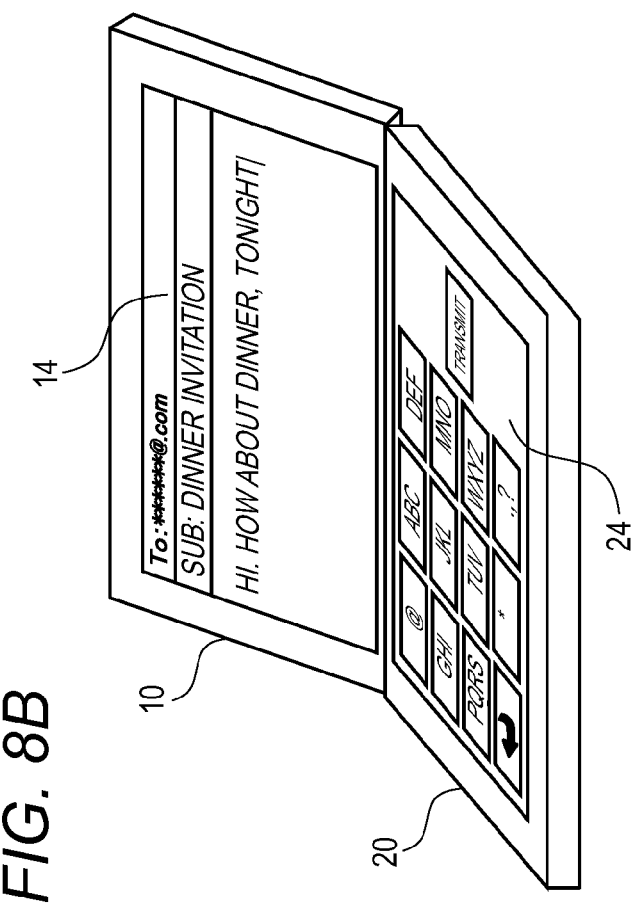
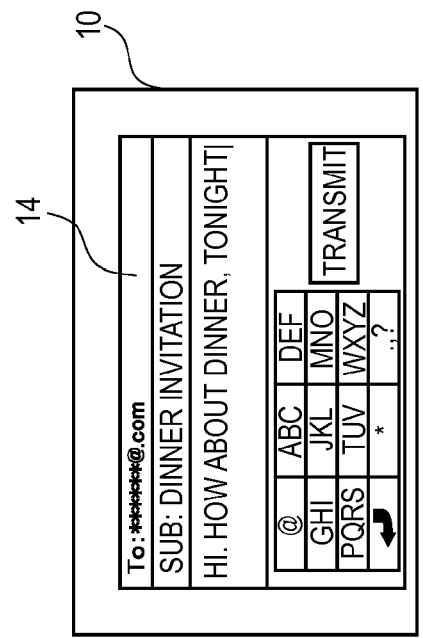
FIG. 8A
FIG. 8B
FIG. 8C

MULTIPLE DISPLAY PORTABLE TERMINAL APPARATUS WITH POSITION-BASED DISPLAY MODES

CROSS-REFERENCE TO RELATED APPLICATION

This application claims priority from Japanese Patent Application No. 2011-097915, filed on Apr. 26, 2011, the entire subject matter of which is incorporated herein by reference.

BACKGROUND OF THE INVENTION

1. Field of the Invention

The present invention relates to a portable terminal apparatus such as a portable telephone, a PDA (Personal Digital Assistant), a tablet PC and the like.

2. Description of the Related Art

There has been suggested a portable terminal apparatus such as a portable telephone having two display units. The portable terminal apparatus is configured such that the two display units can be arranged adjacently (for example, refer to JP Hei. 09-305262A).

In the portable terminal apparatus, a plurality of application programs (hereinafter, referred to as 'applications') can be executed in parallel. As described above, when the portable terminal apparatus has two display units, it is possible to display execution screens of two applications being executed on the two display units, respectively. Hereinafter, such display mode is referred to as 'separate screen display.'

In the meantime, it is also possible to display an execution screen of one application on one large display surface having integrated the display surfaces of the two display units. Hereinafter, such display mode is referred to as 'full screen display.'

In the above configuration, the user convenience can be highly improved if the display mode by the plurality of display units can be easily switched, such as switching of the display mode between the separate screen display, the full screen display and the like.

SUMMARY OF THE INVENTION

The present invention has been made in view of the above circumstances, and an aspect of the present invention is to provide a portable terminal apparatus capable of easily controlling a display mode by a plurality of display units.

According to an illustrative embodiment of the present invention, there is provided a portable terminal apparatus comprising: a first cabinet having a first display surface; a second cabinet having a second display surface; a support mechanism which supports the first cabinet and the second cabinet such that an arrangement state is switchable between a first arrangement state where the first display surface and the second display surface are arranged adjacently and a second arrangement state where the first display surface and the second display surface are arranged to have a relative position therebetween different from that of the first arrangement state; a state detection unit which detects a switching between the first arrangement state and the second arrangement state; and a control unit which controls display on the first display surface and the second display surface. The control unit controls a display mode of the first display surface and the second display surface according to the switching between the first arrangement state and the second arrangement state.

According to another illustrative embodiment of the present invention, there is provided a non-transitory computer readable storage medium having a computer program stored thereon and readable by a computer of a portable terminal apparatus including a first cabinet having a first display surface, a second cabinet having a second display surface, a support mechanism which supports the first cabinet and the second cabinet such that an arrangement state is switchable between a first arrangement state where the first display surface and the second display surface are arranged adjacently and a second arrangement state where the first display surface and the second display surface are arranged to have a relative position therebetween different from that of the first arrangement state, and a state detection unit which detects a switching between the first arrangement state and the second arrangement state, the computer program, when executed by the computer, causing the computer to perform operations comprising: controlling a display mode of the first display surface and the second display surface according to the switching between the first arrangement state and the second arrangement state.

According to a further illustrative embodiment of the present invention, there is provided a method for controlling a portable terminal apparatus including a first cabinet having a first display surface, a second cabinet having a second display surface, a support mechanism which supports the first cabinet and the second cabinet such that an arrangement state is switchable between a first arrangement state where the first display surface and the second display surface are arranged adjacently and a second arrangement state where the first display surface and the second display surface are arranged to have a relative position therebetween different from that of the first arrangement state, and a state detection unit which detects a switching between the first arrangement state and the second arrangement state, the method comprising: controlling a display mode of the first display surface and the second display surface according to the switching between the first arrangement state and the second arrangement state.

According to the above configuration, it is possible to provide the portable terminal apparatus capable of easily controlling the display mode by the plurality of display units.

The effects and significances of the present invention will be more apparent by following illustrative embodiments. However, the illustrative embodiments are just exemplary regarding implementations of the present invention and the present invention is not limited to the following illustrative embodiments.

BRIEF DESCRIPTION OF THE DRAWINGS

The above and other aspects of the present invention will become more apparent and more readily appreciated from the following description of illustrative embodiments of the present invention taken in conjunction with the attached drawings, in which:

FIGS. 5A and 5B show states where launcher screens and application execution screens are displayed on a first display surface and a second display surface according to the illustrative embodiment;

FIGS. 8A to 8C show examples of a screen display when the display control of FIGS. 6 and 7 is executed;

DETAILED DESCRIPTION OF THE INVENTION

Hereinafter, a portable telephone according to illustrative embodiments of the present invention will be described.

<Configuration of Portable Telephone>

Figure 1B:
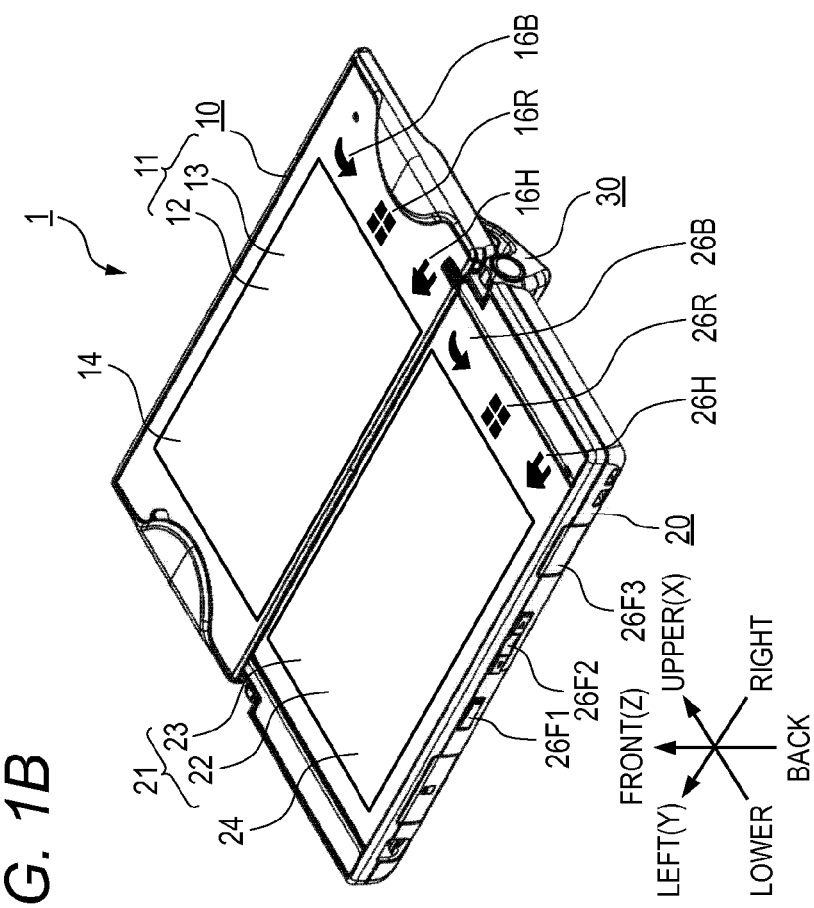
FIGS. 1A to 1D show outer and sectional configurations of a portable telephone at a closed state and an open state according to an illustrative embodiment.
Figure 1D:
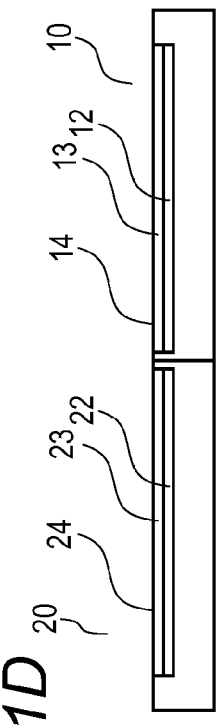
Figure 1A:
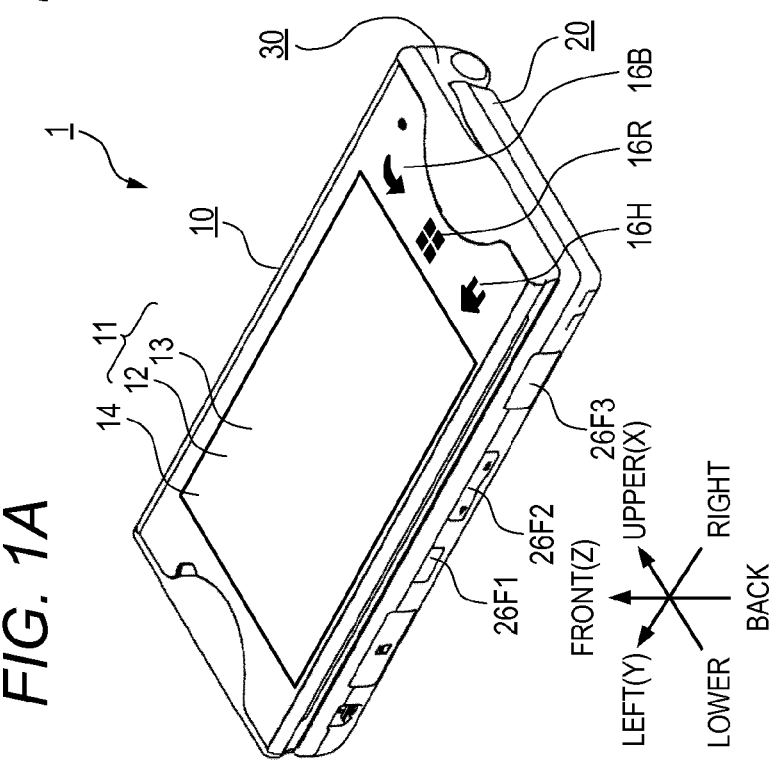
Figure 1C:
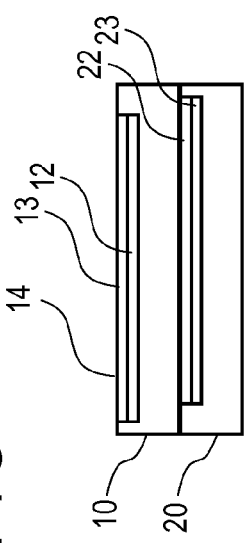

FIGS. 1A to 1D and FIGS. 2A and 2B show a configuration of a portable telephone 1 according to an illustrative embodiment. FIG. 1A is a perspective view showing a configuration of the portable telephone 1 at a closed state and FIG. 1B is a perspective view showing a configuration of the portable telephone 1 at an open state. FIG. 1C is an internal perspective view when seen from a right side of the portable telephone 1 of FIG. 1A and FIG. 1D is an internal perspective view when seen from a right side of the portable telephone 1 of FIG. 1B.

Figure 2B:
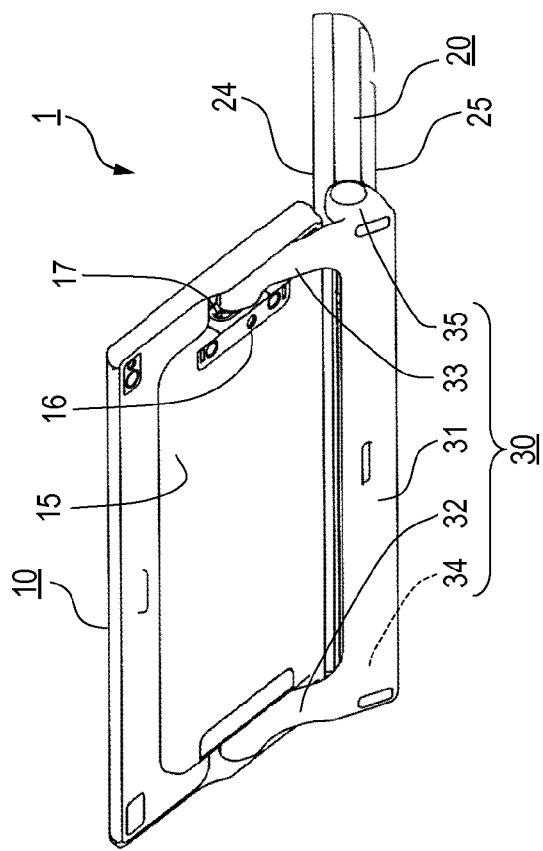
FIGS. 2A and 2B show an outer appearance of the portable telephone at a tilt state according to the illustrative embodiment.
Figure 2A:
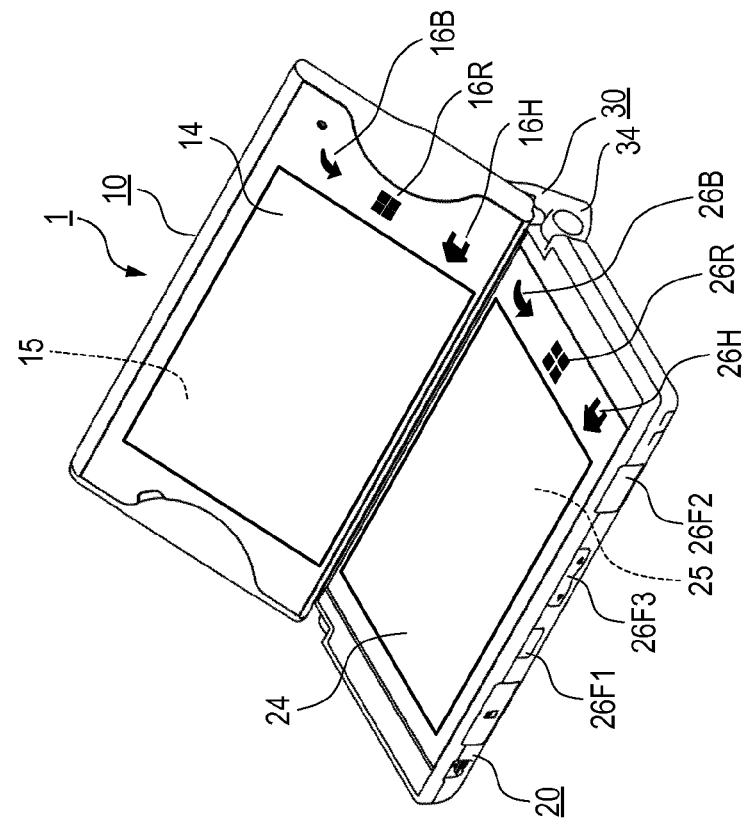

FIG. 2A is a perspective view of the portable telephone 1 at a tilt state, which is seen from a front side of a first cabinet 10 and FIG. 2B is a perspective view of the portable telephone 1 at the tilt state, which is seen from a back side of the first cabinet 10.

Referring to FIG. 1, the portable telephone 1 has a first cabinet 10, a second cabinet 20 and a connection part 30 that connects the first and second cabinets 10, 20.

In the below, directions of 'right side', 'left side', 'upper side', 'lower side', 'front side' and 'back side' of the portable telephone 1 are set as shown in FIGS. 1A and 1B. Positive directions of X, Y and Z axes correspond to upper side, left side and front side directions, respectively. 'Front faces' of the first and second cabinets 10, 20 are front side faces of the first and second cabinets 10, 20, respectively. 'Back faces' of the first and second cabinets 10, 20 are back side faces of the first and second cabinets 10, 20, respectively.

A closed state refers to a state where the first cabinet 10 overlaps with the front face of the second cabinet 20. An open state refers to a state where the first cabinet 10 is arranged at the upper side of the second cabinet 20.

The first cabinet 10 has a flat parallelepiped rectangular shape which is long in the left-right direction. A first touch panel 11 is arranged on the front face of the first cabinet 10. The first touch panel 11 includes a first display 12 and a first touch sensor 13.

The first display 12 is a liquid crystal display and has a liquid crystal panel, a backlight and a driver circuit which drives the liquid crystal panel and the backlight (not shown). Based on a screen signal and a control signal received from a display control device (which will be described later), the driver circuit drives the liquid crystal panel and the backlight, so that a screen image is drawn on the liquid crystal panel and the backlight is turned on. Thereby, a user can see the drawn screen image through a first display surface 14 which is an outer surface of the first touch panel 11.

The first touch sensor 13 is a rectangular transparent sheet and overlaps with the first display 12. When the user makes an input to the first display surface 14, i.e., the user touches the first display surface 14, the first touch sensor 13 detects a touched position (input position) on the first display surface 14. The first touch sensor 13 outputs a position signal corresponding to the detected input position.

In the meantime, the description that the user 'touches' the first display surface 14 refers to that the user touches the first display surface 14 with a finger or a touch member such as a pen. When the user presses or pats the first display surface 14 or draws a figure or letter on the first display surface 14 by the touch member, the 'touch' operation is performed. The description that the user 'taps' the first display surface 14 refers to an operation in which the user touches any position on the first display surface 14 with the touch member or finger, as the touch member or finger bounces on the first display surface 14, and then releases the touching in a short time. The description that the user 'slides' the first display surface 14 refers to an operation in which the user moves the touch member or finger along the first display surface 14 with touching the first display surface 14.

A lens window 15 (refer to FIG. 2B) for imaging a moving picture and a still image is arranged on a left side of the back face part of the first cabinet 10.

A key group 16 is arranged on the front face of the first cabinet 10. The key group 16 includes a home key 16H for displaying a home screen on the first display surface 14, a back key 16B for bringing back a screen, which is displayed on the first display surface 14 at the time of application execution, to a previous screen and a launcher key 16R for displaying an application start screen (launcher screen) including an icon for starting an application on the first display surface 14.

The home key 16H, the back key 16B and the launcher key 16R are touch keys. When any one of the home key 16H, the back key 16B and the launcher key 16R is touched by a finger and the like, a touch sensor (not shown) of a key input circuit (which will be described later) detects the touch operation and outputs a signal corresponding to the touched key.

The second cabinet 20 has a flat parallelepiped rectangular shape which is long in the left-right direction. A second touch panel 21 is arranged on the front face of the second cabinet 20. The second touch panel 21 includes a second display 22 and a second touch sensor 23.

A configuration of the second display 22 is the substantially same as that of the first display 12. The second display 22 is a liquid crystal display and has a liquid crystal panel, a backlight and a driver circuit which drives the liquid crystal panel and the backlight (not shown). Based on a screen signal and a control signal received from the display control device (which will be described later), the driver circuit drives the liquid crystal panel and the backlight, so that a screen image is drawn on the liquid crystal panel and the backlight is turned on. Thereby, the user can see the drawn screen image through a second display surface 24 that is an outer surface of the second touch panel 21.

The second touch sensor 23 is a rectangular transparent sheet and overlaps with the second display 22. When the user touches the second display surface 24, the second touch sensor 23 detects a touched position on the second display surface 24. The second touch sensor 23 outputs a position signal corresponding to the detected position.

A key group 26 is arranged on the front face and the side face of the second cabinet 20. The key group 26 includes a home key 26H for displaying a home screen on the second display surface 24, a back key 26B for bringing back a screen, which is displayed on the second display surface 24 at the time of application execution, to a previous screen, a launcher key 26R for displaying an application start screen on the second display surface 24, and the like. The home key 26H, the back key 26B and the launcher key 26R are touch keys. When any one of the home key 26H, the back key 26B and the launcher key 26R is touched by a finger and the like, the touch sensor (not shown) of the key input circuit (refer to FIG. 4) detects the touch operation and outputs a signal corresponding to the touched key.

The key group 26 further includes function keys 16F1, 16F2, 16F3 which are arranged on a lower side face part of the second cabinet 20. The function keys 16F1, 16F2, 16F3 are keys which are provided so as to start a predetermined application and to adjust a volume at the time of application execution and for the other various functions. When the function keys 16F1, 16F2, 16F3 are pressed, the key input circuit (refer to FIG. 4) detects the pressing and outputs a signal corresponding to the pressed key.

Referring to FIG. 1C, at the closed state, only the first display surface 14 of the first and second display surfaces 14, 24 faces the outside. The second display surface 24 is arranged at the back of the first cabinet 10 and does not face the outside. Referring to FIG. 1D, at the opened state, the first and second display surfaces 14, 24 face the outside from the front face side of the portable telephone 1.

In the meantime, at the opened state, a boundary of the lower side of the first display surface 14 is located at a position (several mm) close to a side face of the lower side of the first cabinet 10. Likewise, a boundary of the upper side of the second display surface 24 is located at a position (several mm) close to a side face of the upper side of the second cabinet 20. That is, at the opened state, since a gap between the first display surface 14 and the second display surface 24 is small, the user can recognize the first display surface 14 and the second display surface 24 as one integrated display surface.

At the tilt state shown in FIGS. 2A and 2B, the first cabinet 10 is arranged at the upper side of the second cabinet 20. At this time, unlike at the open state, the respective front faces of the first and second cabinets 10, 20 at the tilt state are arranged to have a predetermined obtuse angle (for example, one hundred and several tens degrees) therebetween, as shown in FIGS. 2A and 2B.

The connection part 30 has a central frame 31, a first right frame 32, a first left frame 33, a second right frame 34 and a second left frame 35. The central frame 31 has a shape extending in the left-right direction. A right side end of the central frame 31 is connected to one end of the first right frame 32 and one end of the second right frame 34. A left side end of the central frame 31 is connected to one end of the first left frame 33 and one end of the second left frame 35.

Shafts (not shown) extending in the left-right direction are respectively arranged at the other ends of the first right frame 32 and the first left frame 33. The shafts are inserted by recess parts 17 which are arranged at left and right side face parts of the first cabinet 10. Meanwhile, in FIG. 2B, only the recess part 17 of the left side face part is shown. The shafts are held in the first cabinet 10 such that they can be slid along the recess parts 17. Thereby, the first cabinet 10 is held by the first right frame 32 and the first left frame 33 such that it can be rotated about the shafts and can be slid vertically along the recess parts 17.

The second right frame 34 and the second left frame 35 rotatably keep the second cabinet 20 about an axis of the left-right direction.

As described below with reference to FIGS. 3A to 3F, the connection part 30 keeps the first and second cabinets 10, 20 such that the open state and the closed state can be switched via the tilt state. The user can manually change the arrangement state of the portable telephone 1. The first display surface 14 and the second display surface 24 have a substantially rectangular shape, respectively. At the open state and the tilt state, the first display surface 14 and the second display surface 24 are arranged such that long sides thereof are adjacent to each other. In the meantime, the open state, the tilt state and the closed state are examples of a first arrangement state, a second arrangement state and a third arrangement state, respectively.

FIGS. 3A to 3F show that the screen state of the portable telephone 1 is switched from the closed state (FIG. 3A) to the open state (FIG. 3F) via the tilt state (FIG. 3D), which is seen from the right side of the portable telephone 1.

Figures 3A, 3B, 3C, 3D, 3E, 3F:
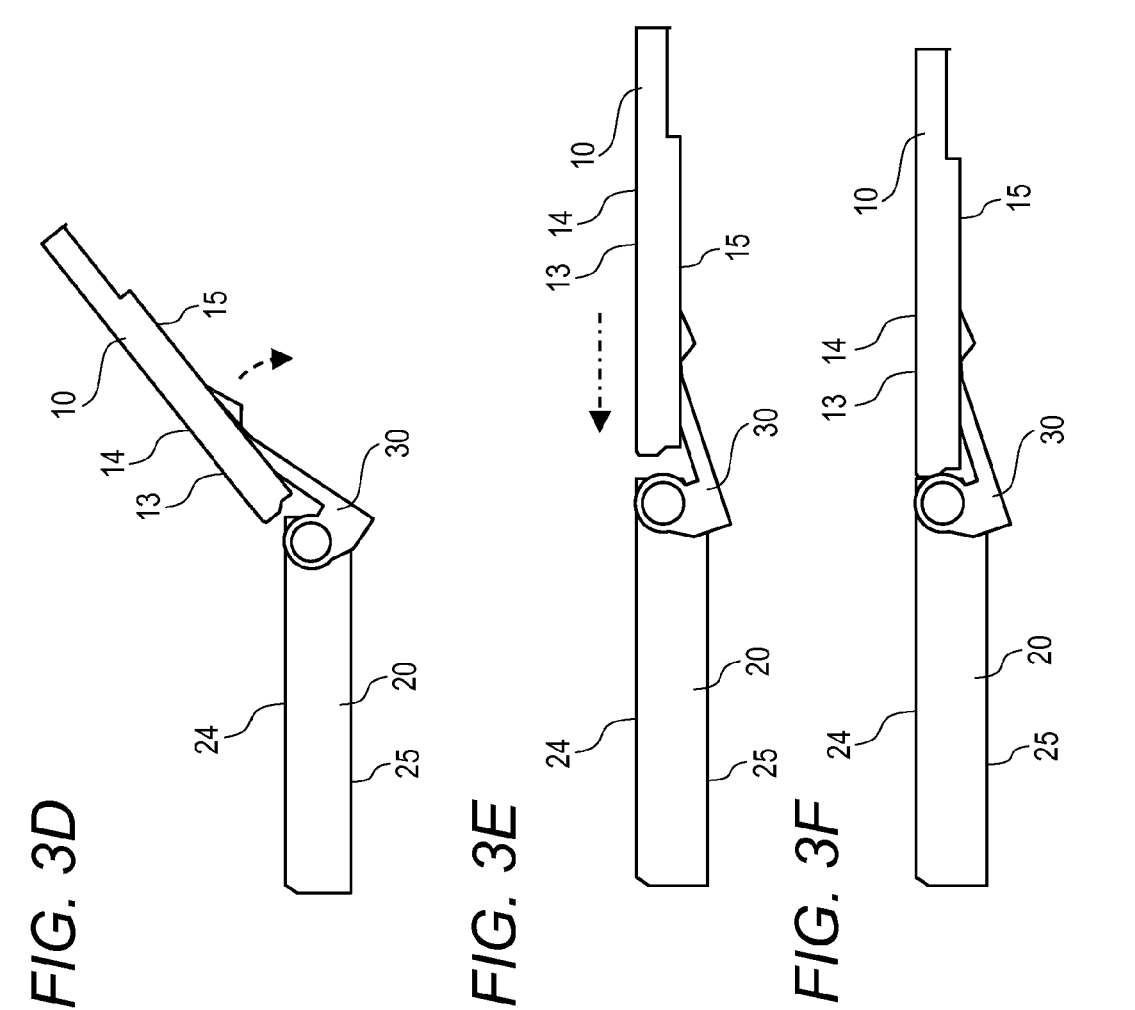
FIGS. 3A to 3F show the portable telephone which is changed from the closed state to the open state according to the illustrative embodiment.

When the first cabinet 10 is moved forward (refer to a dotted line arrow in FIG. 3A) from the closed state of the portable telephone 1, which is shown in FIG. 3A, the back face of the first cabinet 10 gets away from the front face of the second cabinet 20, as shown in FIG. 3B. At this time, as the first cabinet 10 is moved, the connection part 30 is rotated in a clockwise direction (refer to a solid line arrow).

At the state shown in FIG. 3B, when the first cabinet 10 is further moved forward and the first display surface 14 is rotated downward (refer to a dotted line arrow), the state of the portable telephone 1 reaches the tilt state of FIG. 3D via the arrangement state of FIG. 3C. At the tilt state, the lower side of the back face of the first cabinet 10 is in contact with the connection part 30.

When the connection part 30 is further rotated in the clockwise direction (refer to a dotted line arrow of FIG. 3D) with the lower side of the back face of the first cabinet 10 being in contact with the connection part 30, the portable telephone 1 reaches a state where the first display surface 14 and the second display surface 24 form a substantial one plane (flush), as is shown in FIG. 3E.

In FIG. 3E, a gap (several mm) is formed between the first cabinet 10 and the second cabinet 20. When the first cabinet 10 is slid in the downward direction (refer to a dotted-dashed line arrow) toward the second cabinet 20, the portable telephone 1 reaches the open state, as shown in FIG. 3F. At this time, the side face of the lower side of the first cabinet 10 and the side face of the upper side of the second cabinet 20 are brought into contact with each other.

In the meantime, when the portable telephone 1 is at the tilt state shown in FIG. 3D, i.e., when the portable telephone is at a state where the first right frame 32 and first left frame 33 and the second cabinet 20 form a predetermined obtuse angle therebetween, the connection part 30 has a structure for weakly regulating the rotating of the connection part 30. Since the rotating is weakly regulated, the user can use the portable telephone 1 with being kept at the tilt state and can easily change the using state from the tilt state to the open state or closed state.

Figure 4:
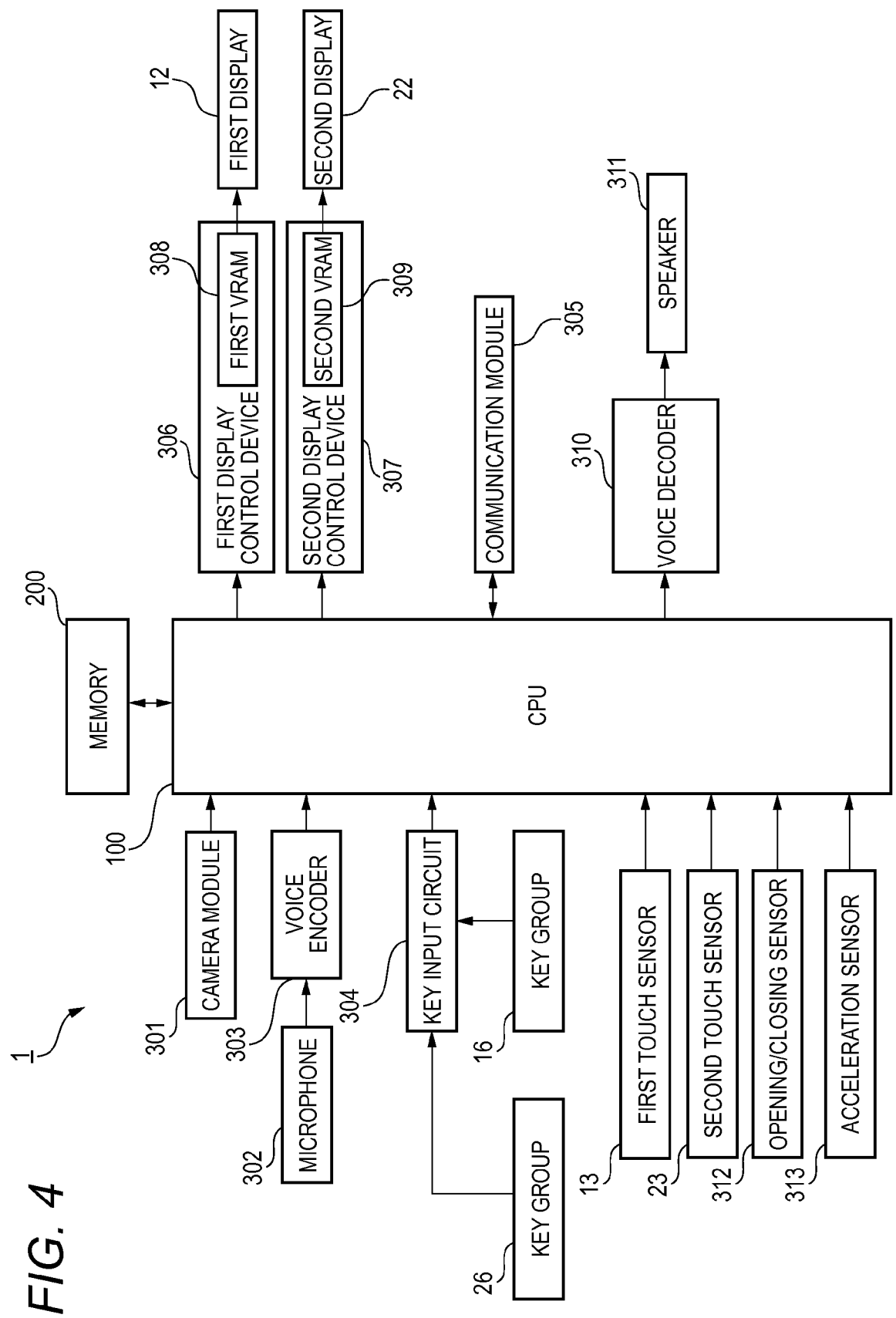
FIG. 4 is a block diagram showing an overall configuration of the portable telephone according to the illustrative embodiment.

FIG. 4 is a block diagram showing an overall configuration of the portable telephone 1. The portable telephone 1 of this illustrative embodiment has a CPU 100, a memory 200, a camera module 301, a microphone 302, a voice encoder 303, a key input circuit 304, a communication module 305, a first display control device 306, a second display control device 307, a first VRAM 308, a second VRAM 309, a voice decoder 310, a speaker 311, an opening/closing sensor 312 and an acceleration sensor 313, in addition to the above-explained constitutional elements.

The camera module 301 is arranged in the first cabinet 10. The camera module 301 performs an imaging through the lens window 15 and generates a digital imaging signal by an image encoder (not shown) embedded in the camera module 301. The camera module 301 outputs the generated imaging signal to the CPU 100.

The microphone 302 is arranged in the first cabinet 10. The microphone 302 converts collected voice into a voice signal and outputs the same to the voice encoder 303. The voice encoder 303 converts the analogue voice signal from the microphone 302 into a digital voice signal and outputs the converted digital voice signal to the CPU 100.

When each key of the key groups 16, 26 is pressed, the key input circuit 304 outputs a signal corresponding to the pressed key to the CPU 100.

The communication module 305 has an antenna (not shown) which transmits and receives electric waves for call or communication. The communication module 305 converts the signal input from the CPU 100 into a wireless signal and transmits the converted wireless signal to a communication destination such as base station and other communication apparatus through the antenna. Also, the communication module 305 converts the wireless signal received through the antenna into a signal having a format that can be used by the CPU 100 and outputs the converted signal to the CPU 100.

The first display control device 306 and the second display control device 307 control the first display 12 and the second display 22, respectively. The first display control device 306 and the second display control device 307 have an LCD controller, respectively. Also, the first display control device 306 and the second display control device 307 have the first VRAM 308 and the second VRAM 309 for storing screens, respectively.

The first display control device 306 generates data for screen display, based on image data input from the CPU 100, and stores the generated screen data in the first VRAM 308, based on a control signal input from the CPU 100. The first VRAM 308 can store screen data of a plurality of screens (for example, several screens). The first display control device 306 outputs the screen data of a display object, which is stored in the first VRAM 308, to the driver circuit of the first display 12 at a predetermined time interval (for example, several tens times per second).

The second display control device 307 has the same configuration as that of the first display control device 306. That is, the second display control device 307 stores a plurality of screen data in the second VRAM 309, based on a control signal and image data input from the CPU 100. The second display control device 307 outputs the screen data of a display object, which is stored in the second VRAM 309, to the driver circuit of the second display 22 at a predetermined time interval (for example, several tens times per second).

In the meantime, the first and second display 12, 22 may be other planar type display apparatuses such as LED display.

The voice decoder 310 performs decode processing and D/A conversion for a sound signal output from the CPU 100 and outputs the converted signal to the speaker 311. The speaker 311 outputs sound, based on the signal input from the voice decoder 310.

The opening/closing sensor 312 detects an angle of the connection part 30 relative to the second cabinet 20. The opening/closing sensor 312 has an angle sensor which detects an angle between the second cabinet 20 and the connection part 30, and outputs a digital signal corresponding to the detected angle to the CPU 100. The CPU 100 executes processing of detecting whether the current arrangement state of the first cabinet 10 and the second cabinet 20 of the portable telephone 1 is the open state, the closed state or the tilt state, based on the signal output from the opening/closing sensor 312.

In the meantime, the screen state may be detected by a device or means other than the angle sensor. For example, a magnetic sensor may be used to detect the screen state. In this case, for example, the magnetic sensor is arranged in the second cabinet 20 and a magnet is provided to the first cabinet 10 or connection part 30. The opening/closing sensor 312 outputs a signal, which enables the CPU 100 to detect the open/closed state, to the CPU 100, based on that the magnetic sensor detects different magnetic forces depending on the screen states.

When it is detected that the arrangement state is changed from the open state or tilt state to the closed state, the CPU 100 controls the second display 22 via the second display control device 307 so as to stop the drawing on the second display surface 24 and to turn off the backlight of the second display 22. When it is detected that the arrangement state is changed from the closed state to the tilt state or open state, the CPU 100 controls the second display 22 via the second display control device 307 so as to start the drawing on the second display surface 24 and to turn on the backlight of the second display 22, based on functions being executed.

The acceleration sensor 313 is arranged in the second cabinet 20 and detects acceleration which is applied to the portable telephone 1. The acceleration sensor 313 is a three-axis acceleration sensor and detects accelerations which occur in three directions of X-axis, Y-axis and Z-axis directions of FIG. 1. The acceleration sensor 313 outputs an acceleration signal corresponding to the detected acceleration to the CPU 100. The CPU 100 detects which direction of horizontal and vertical directions the portable telephone 1 faces, based on the acceleration signal output from the acceleration sensor 313. In the meantime, when the using state is the tilt state, the CPU 100 detects which direction of horizontal and vertical directions the portable telephone 1 faces, based on the direction of the second cabinet 20 having the acceleration sensor 313 provided thereto.

In the meantime, when the upper-lower direction of FIGS. 1A and 1B is the horizontal direction, it is detected that the portable telephone 1 faces the 'vertical direction', and when the left-right direction of FIGS. 1A and 1B is the horizontal direction, it is detected that the portable telephone 1 faces the 'horizontal direction.' Regarding the directions of the portable telephone 1, the horizontal direction is an example of a first direction and the vertical direction is an example of a second direction.

The memory 200 includes a ROM and a RAM. The memory 200 stores therein control programs for providing the CPU 100 with the control functions. The control programs include a program for display control when the arrangement state of the portable telephone 1 is switched among the open state, the tilt state and the closed state. Also, the memory 200 stores therein a variety of applications such as call, electronic mail (hereinafter, simply referred to as 'main'), camera function, web browser, music player and the like.

Also, the memory 200 is used as a working memory which stores various data temporarily used or generated at the time of application execution.

In the memory 200, data for screen generation, information input by the first and second touch sensors 13, 23, addresses of screens stored in the first and second VRAMs 308, 309, an execution state of an application or task which the execution thereof is temporarily stopped, a task list which shows history of the screens displayed on the first and second display surfaces 14, 24, and the like are stored with predetermined file formats, in addition to the control programs.

The CPU 100 operates the camera module 301, the microphone 302, the communication module 305, the first and second displays 11, 22, the speaker 311 and the like, in response to an input by an operation, a control programs to be executed, an input signal from a sensor and the like. Thereby, the CPU 100 executes the various applications such as call, camera function, electronic mail, web browser, map, music player and the like.

The CPU 100 operates the camera module 301, the microphone 302, the communication module 305, the first and second displays 12, 22, the speaker 311 and the like, in accordance with the control programs, based on the operation input signals from the key input circuit 304 and the respective touch sensors 13, 23.

<Functions of Portable Telephone>

FIG. 5A shows a state where launcher screens are displayed on the first display surface 14 and the second display surface 24. FIG. 5B shows a state where execution screens of applications, which have started through operations on the launcher screens, are displayed on the first display surface 14 and the second display surface 24. Meanwhile, in FIGS. 5A and 5B, the configuration of the portable telephone 1 is pictorially shown and the configuration of the parts such as key groups 16, 26 are not shown, which are same in FIGS. 8, 10 and 14.

As shown in FIG. 5A, icons D1 corresponding to the various applications are displayed on the launcher screens. The applications can be purchased by the download through the internet, in addition to the applications beforehand provided in the portable telephone 1. The purchased applications are added to the portable telephone 1 by installation.

The user taps a desired icon D1 with a finger and the like, thereby starting a desired application.

In the memory 200, an icon correspondence table in which the respective icons D1 and positions of the respective icons D1 on the display surfaces 14, 24 are associated with each other and an application correspondence table in which the respective icons D1 and the respective applications are associated with each other are stored. When the icon D1 is tapped, the CPU 100 specifies the tapped icon D1 by using the icon correspondence table, based on the tapped position. Also, the CPU 100 specifies an application corresponding to the tapped icon D1 by using the application correspondence table and starts the specified application.

When the icon D1 displayed on the first display surface 14 is tapped, an execution screen corresponding to the icon D1 is displayed on the first display surface 14. Also, when the icon D1 displayed on the second display surface 24 is tapped, an execution screen corresponding to the icon D1 is displayed on the second display surface 24. For example, as shown in FIG. 4B, when a mail application starts on the first display surface 14, a mail preparation screen is displayed on the first display surface 14. Also, when a web browser starts on the second display surface 24, a web screen based on the URL is displayed on the second display surface 24.

In this illustrative embodiment, the user can switch the display mode on the first display 12 and the second display 14 between a full screen display and a separate screen display. In the meantime, the display mode of the separate screen display is an example of a first mode and the display mode of the full screen display is an example of a second mode.

Figure 6A:
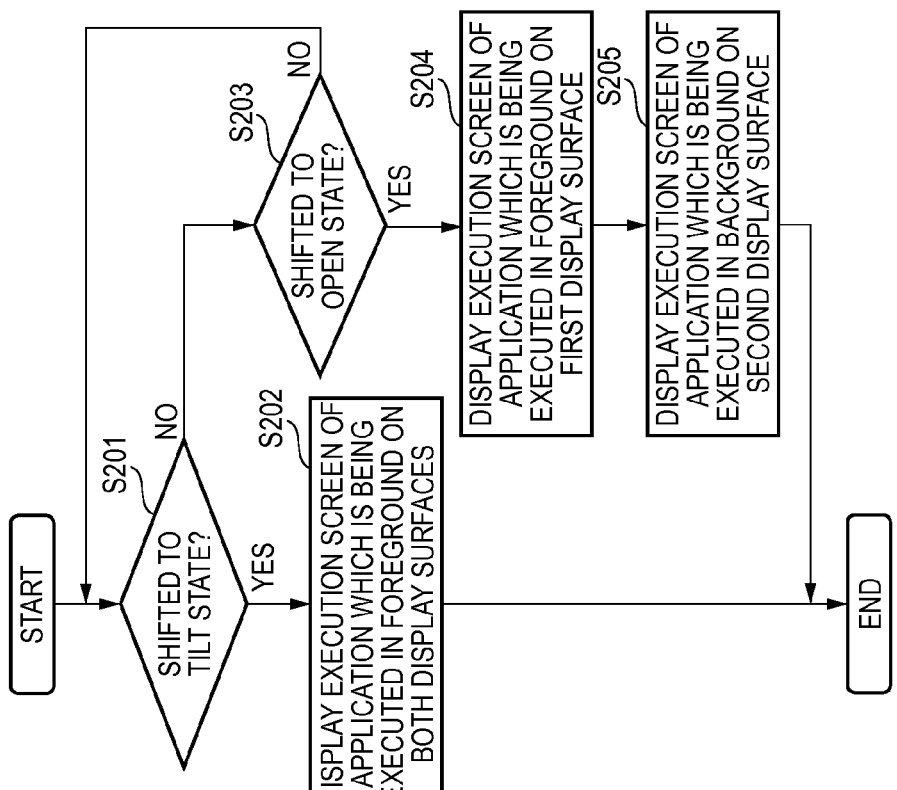
FIGS. 6A and 6B are flowcharts showing a processing sequence of display control for switching a display mode when the portable telephone is switched among the open, tilt and closed states according to the illustrative embodiment.
Figure 6B:
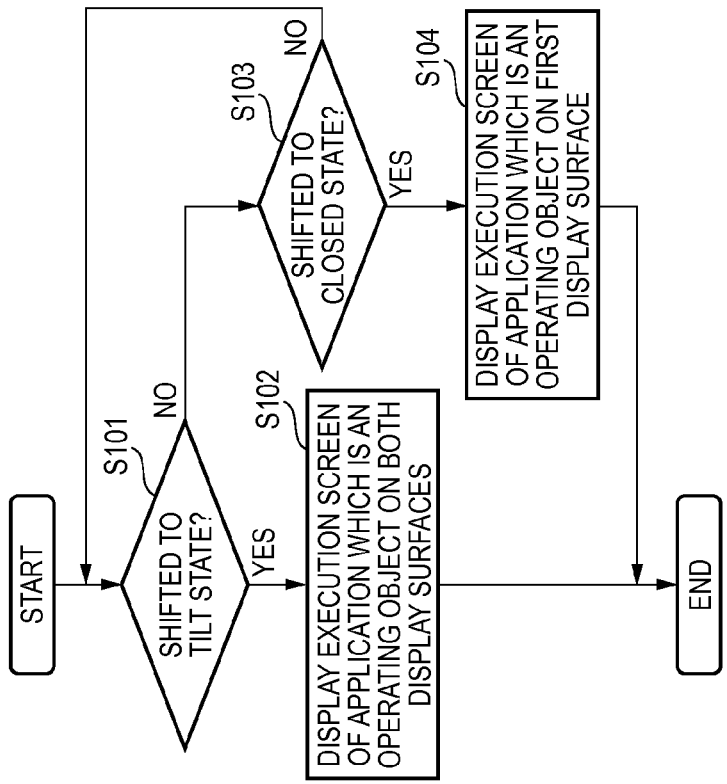
Figure 7:
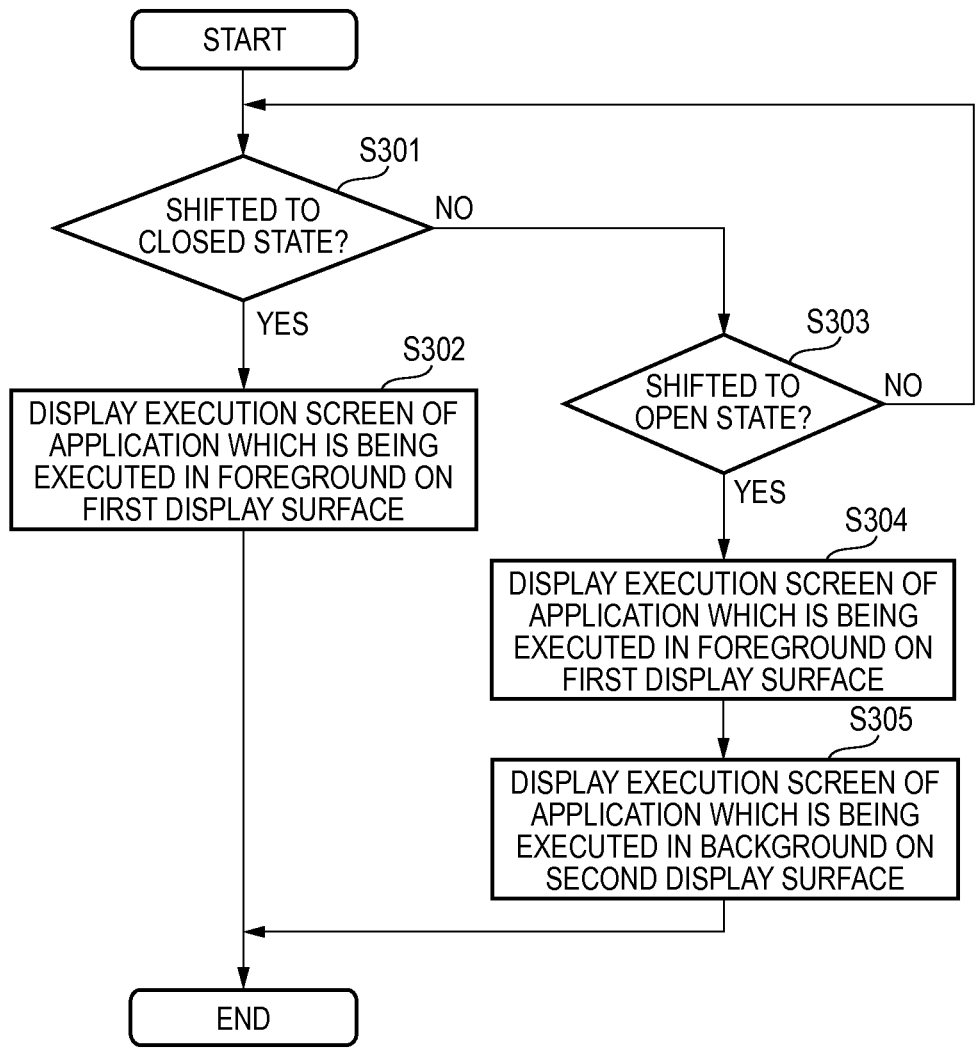
FIG. 7 is a flowchart showing a processing sequence of display control for switching a display mode when the portable telephone is switched among the open, tilt and closed states according to the illustrative embodiment.

FIGS. 6A, 6B and 7 are flowcharts showing processing sequences of display control for switching the display mode when the portable telephone 1 is switched among the open state, the tilt state and the closed state. FIG. 6A is a flowchart showing the display control when the portable telephone is shifted from the open state to the tilt state or closed state during the separate screen display. FIG. 6B is a flowchart showing the display control when the portable telephone is shifted from the closed state to the tilt state or open state. FIG. 7 is a flowchart showing the display control when the portable telephone is shifted from the tilt state to the closed state or open state during the full screen display.

FIGS. 8A to 8C show examples of a screen display when the display controls of FIGS. 6A, 6B and 7 are executed. Specifically, FIGS. 8A to 8C show examples of the screen display at the open state, the tilt state and the closed state, respectively.

When the portable telephone 1 is at the open state and the display mode is the separate screen mode, the display control of FIG. 6A is executed. For example, as shown in FIG. 8A, at the open state, a mail preparation screen is displayed on the first display surface 14 and a web screen is displayed on the second display surface 24. On the mail preparation screen, an input display part which displays a destination, a subject, a text and the like and an input operation part which includes a tenkey (keyboard), a transmission key and the like are displayed on the first display surface 14.

Referring to FIG. 6A, the CPU 100 determines whether the arrangement state of the portable telephone 1 is shifted from the open state to the tilt state (S101). When the portable telephone 1 is stopped at a position of the tilt state, the CPU 100 determines that the portable telephone is shifted to the tilt state. Also, the CPU 100 monitors whether the arrangement state of the portable telephone 1 is shifted from the open state to the closed state (S103).

When a user wants to display an execution screen of an application which is currently operated in the full screen display mode, the user switches the portable telephone 1 from the open state to the tilt state.

Thereby, when it is determined that the portable telephone is shifted to the tilt state (S101: YES), the CPU 100 displays the execution screen of the application which is the current operating object on the first display surface 14 and the second display surface 24 (S102). Here, the CPU 100 keeps the operation history of the display surfaces 14, 24 to be stored in the memory 200. When the portable telephone is shifted to the tilt state, the CPU 100 sets an application corresponding to the display surface which has been operated last, as the application which is the current operating object.

For example, as shown in FIG. 8A, when the mail application which is being executed on the first display surface 14 is the operating object, the mail preparation part is displayed on the first display surface 14 and the second display surface 24, as shown in FIG. 8B. At this time, the input display part is displayed on the first display surface 14 and the input operation part is displayed on the second display surface 24. In the meantime, the web browser (an application which is not the operating object) which is executed on the second display surface 24 at the open state does not stop and is subject to the temporary pause state while the web browser is kept executed in the background.

The user may directly switch the portable telephone 1 from the open state to the closed state without stopping the portable telephone at the tilt state.

In this case, the CPU 100 determines that the portable telephone is shifted to the closed state (S103: YES) and displays the execution screen of the application which is the current operating object, on the first display surface 14 (S104). For example, as shown in FIG. 8C, the mail preparation part is displayed on the first display surface 14. At this time, similarly to the open state, the input display part and the input operation part are displayed on the first display surface 124.

Next, when the portable telephone 1 is at the closed state, the display control of FIG. 6B is executed. Referring to FIG. 6B, the CPU 100 monitors whether the arrangement state of the portable telephone 1 is shifted from the closed state to the tilt state (S201). Also, the CPU 100 monitors whether the arrangement state of the portable telephone 1 is shifted from the closed state to the open state (S203).

When the user wants to display the execute screen of the application which is being executed on the first display surface 14, i.e., the application which is being executed in the foreground in the full screen display mode, the user switches the portable telephone 1 from the closed state to the tilt state.

Thereby, when it is determined that the portable telephone is shifted to the tilt state (S201: YES), the CPU 100 displays the execution screen of the application which is executed in the foreground on the first display surface 14 and the second display surface 14 (S202).

For example, when the mail application is executed in the foreground, as shown in FIG. 8C, the mail preparation screen is displayed on the first display surface 14 and the second display surface 14, as shown in FIG. 8B. At this time, the input display part is displayed on the first display surface 14, and the input operation part is displayed on the second display surface 24. In the meantime, the application (for example, web browser) which is being executed in the background at the closed state is subject to the temporary pause state and is kept executed in the background.

The user may directly switch the portable telephone 1 from the closed state to the open state without stopping the portable telephone at the tilt state.

In this case, the CPU 100 determines that the portable telephone is shifted to the open state (S203: YES) and displays the execution screen of the application which is being executed in the foreground on the first display surface 14 (S204) and the execution screen of the application which is being executed in the background on the second display surface 24 (S205). For example, as shown in FIG. 8A, the mail preparation screen is displayed on the first display surface 14 and the web screen is displayed on the second display surface 24.

Next, when the portable telephone 1 is at the tilt state and the display mode is the full screen display mode, the display control of FIG. 7 is executed. Referring to FIG. 7, the CPU 100 monitors whether the arrangement state of the portable telephone 1 is shifted from the tilt state to the closed state (S301) and monitors whether the arrangement state of the portable telephone 1 is shifted from the tilt state to the open state (S303).

When the user wants to make the portable telephone 1 compact during the separate screen display, as shown in FIG. 8B and to continuously use the application which is the operating object, the user switches the portable telephone 1 from the tilt state to the closed state.

Thereby, when it is determined that the portable telephone is shifted to the closed state (S301: YES), the CPU 100 displays the execution screen of the application which is being executed on both the display surfaces 14, 24, i.e., the application which is being executed in the foreground, on the first display surface 14 (S302). For example, when the mail application is being executed in the foreground, the mail preparation screen is displayed on the first display surface 14, as shown in FIG. 8C.

In the meantime, when the user wants to switch the display mode into the separate screen display mode, the user switches the portable telephone 1 from the tilt state to the open state.

Thereby, when it is determined that the portable telephone is shifted to the open state (S303: YES), the CPU 100 displays the execution screen of the application which is being executed in the foreground on the first display surface 14 (S304) and the execution screen of the application which is being executed in the background on the second display surface 24 (S305). For example, as shown in FIG. 8A, the mail preparation screen is displayed on the first display surface 14 and the web screen is displayed on the second display surface 24.

In the meantime, when the screens are displayed on the display surfaces 14, 24 at each state of the open state, the tilt state and the closed state, the CPU 100 detects whether the display surfaces 14, 24 are directed in the horizontal direction (a direction that the width directions of the display surfaces 14, 24 are the vertical direction) or vertical direction (a direction that the longitudinal directions of the display surfaces 14, 24 are the vertical direction) by the acceleration sensor 313. When the display surfaces 14, 24 are directed in the horizontal direction, the CPU 100 displays the screens such that the width directions of the display surfaces 14, 24 become the upper-lower direction of the screens (refer to FIG. 8A). On the other hand, when the display surfaces 14, 24 are directed in the vertical direction, the CPU 100 displays the screens such that the longitudinal directions of the display surfaces 14, 24 become the upper-lower direction of the screens (refer to FIG. 14B).

Effects of the Illustrative Embodiment

According to the above-described illustrative embodiment, the user can easily switch the display mode between the separate screen display and the full screen display by switching the portable telephone 1 between the open state and the tilt state.

Also, according to this illustrative embodiment, since the execution screen of the application which is the current operating object is displayed in the full screen display mode, it is possible to keep using the application which is the operating object.

Also, according to this illustrative embodiment, it is not necessary to display soft keys on the respective display surfaces 14, 24 or to provide hard keys to the cabinets 10, 20 so as to perform the operation of switching the display mode.

Also, according to this illustrative embodiment, even when the display mode is switched into the full screen display, the application which is not the operating object does not stop and is kept executed in the background. Therefore, when the display mode is again switched into the separate screen display, it is possible to rapidly display the execution screens on both the display surfaces 14, 24.

Also, when the portable telephone is switched from the open state to the closed state or from the tilt state to the closed state, the execution screen of the application which is the current operating object is displayed on the first display surface 14. Therefore, the user can keep using the application which is the operating object.

First Modified Illustrative Embodiment

Figure 9:
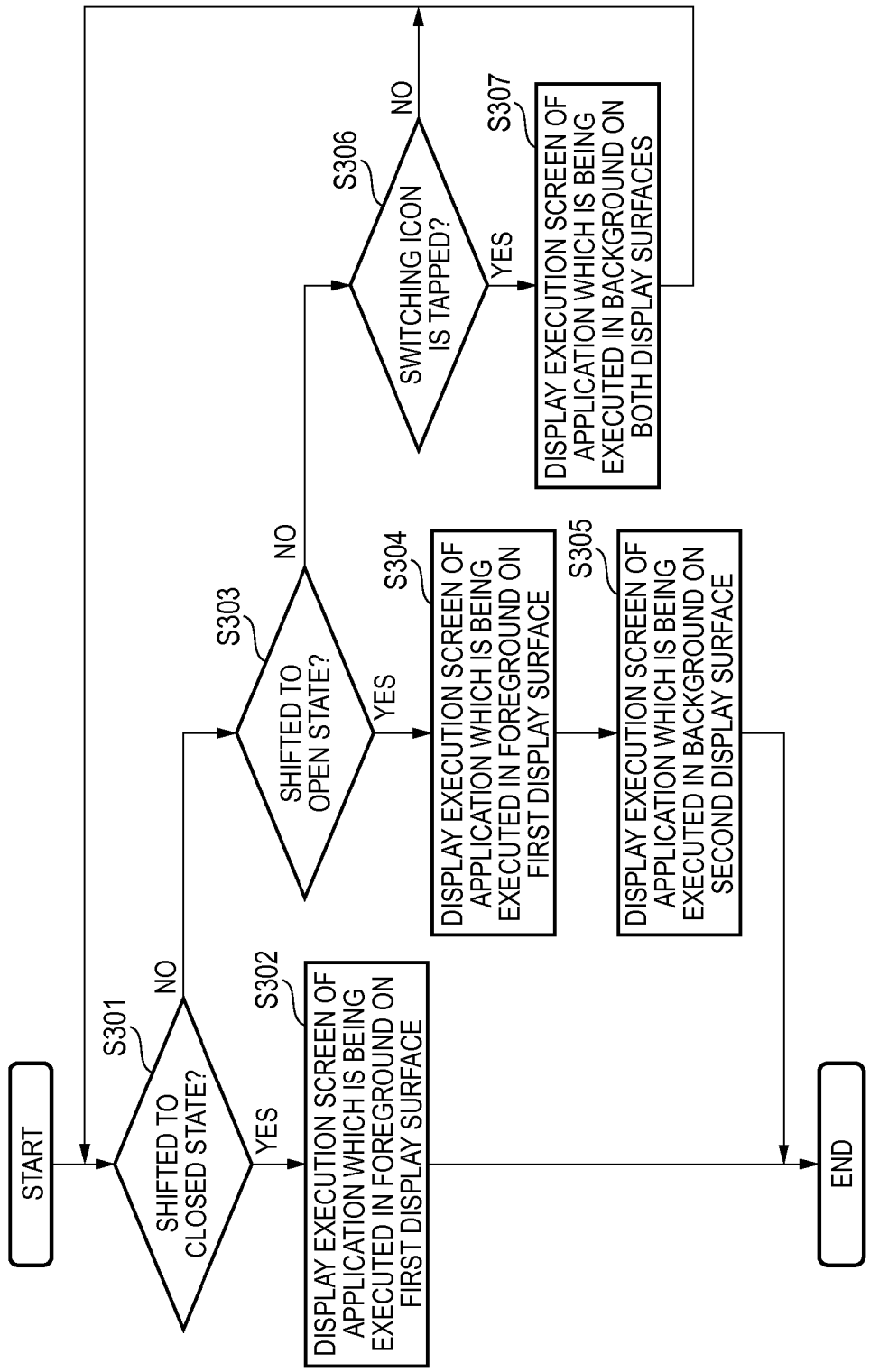
FIG. 9 is a flowchart showing a processing sequence of display control according to a first modified illustrative embodiment.
Figure 10A:
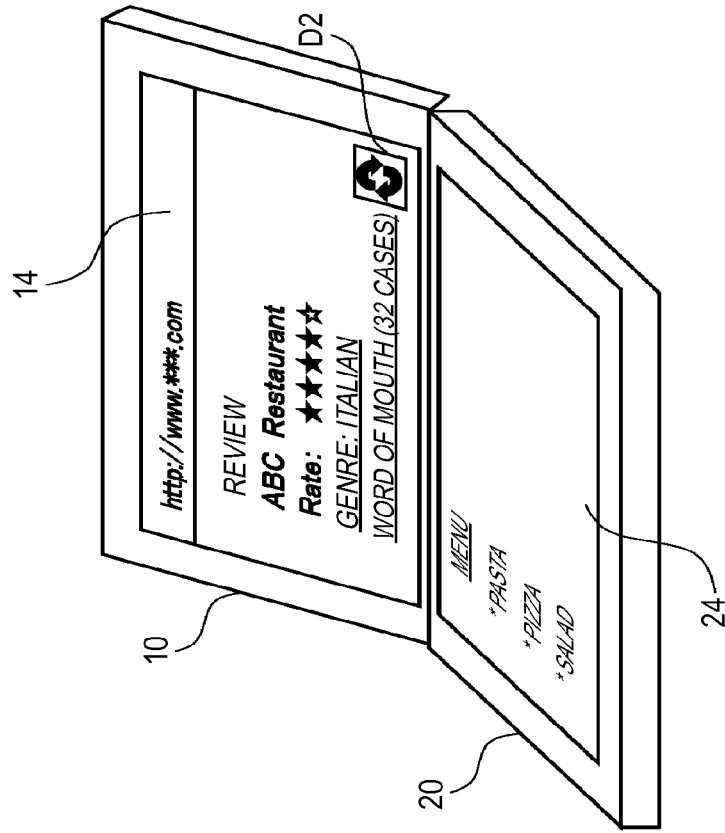
FIGS. 10A and 10B show examples of a screen display when the display control of FIG. 9 is executed.
Figure 10B:
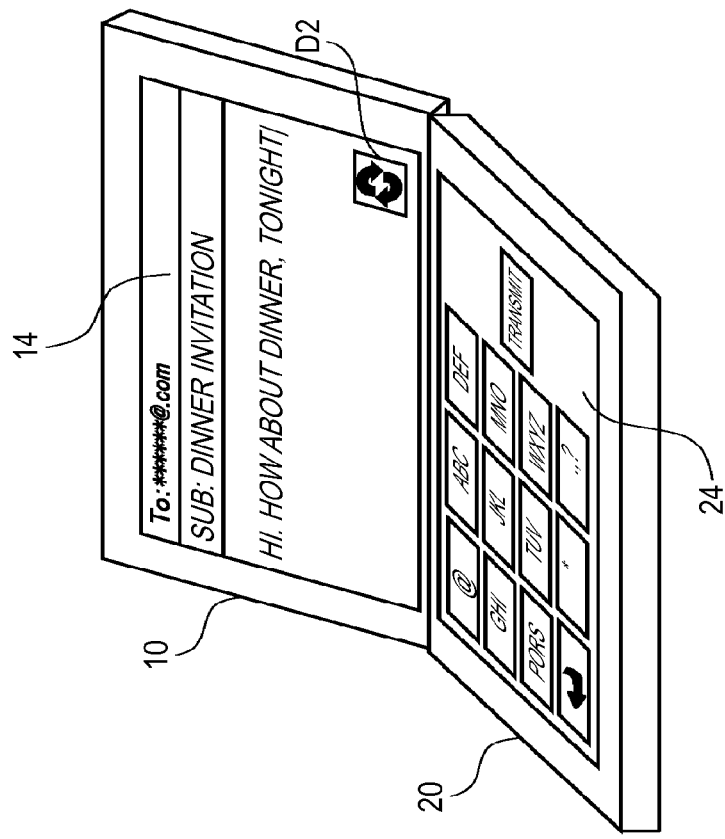

FIG. 9 is a flowchart showing a processing sequence of display control according to a first modified illustrative embodiment. FIGS. 10A and 10B show examples of a screen display when the display control of FIG. 9 is executed.

In this modified illustrative embodiment, the user can switch the screen display such that the execution screen of the application, which is being executed in the background at the tilt state, is displayed on the first display surface 14 and the second display surface 24.

As shown in FIG. 9, in this modified illustrative embodiment, processing of steps S306 and S307 is added to the control processing shown in FIG. 7. The other processing is same as that of the above illustrative embodiment.

As shown in FIGS. 10A and 10B, during the full screen display at the tilt state, a switching icon D2 for switching the screen display is displayed on the first display surface 14.

The CPU 100 monitors the shift to the closed state and the shift to the open state (S301, S303) and monitors whether the switching icon D2 is tapped or not (S306).

As shown in FIG. 10A, for example, at the state where the execution screen of the mail application is displayed in the full screen display mode, when the user wants to use the web browser which is being executed in the background, the user taps the switching icon D2.

Thereby, when it is determined that the switching icon D2 is tapped (S306: YES), the CPU 100 displays the execution screen of the application which is being executed in the background on the first display surface 14 and the second display surface 24 (S307). For example, as shown in FIG. 10B, the web screen of the web browser which is being executed in the background is displayed on the first display surface 14 and the second display surface 24. At this time, the mail application which is being executed in the foreground is kept executed in the background although it is subject to the temporary pause state. The switching icon D2 is kept displayed on the first display surface 14. Therefore, when the switching icon D2 is again tapped, the mail preparation screen is displayed on the first display surface 14 and the second display surface 24, as shown in FIG. 10A.

In the meantime, the switching icon D2 may be displayed on the second display surface 24 or on both the display surfaces 14, 24. Also, the switching icon D2 may be configured such that it is not displayed on the display surfaces 14, 24 at a usual state and is displayed on the display surfaces 14, 24 when a predetermined operation (for example, tapping operation) is made on the display surfaces 14, 24.

That is, according to the configuration of this modified illustrative embodiment at the tilt state, it is possible to easily switch and use the application, which is being executed in the background, into the foreground.

Second Modified Illustrative Embodiment

Figure 11:
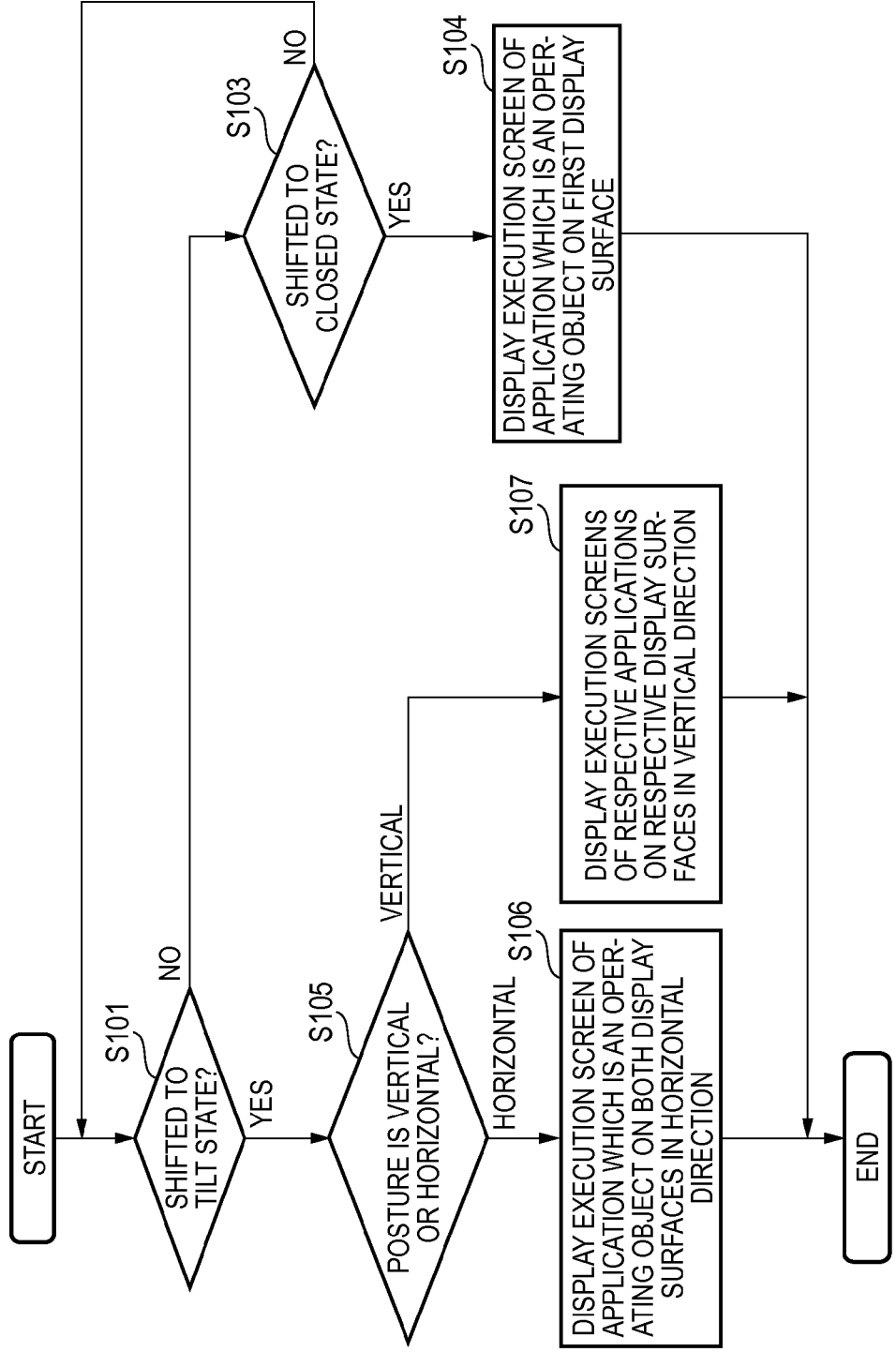
FIG. 11 is a flowchart showing a processing sequence of display control according to a second modified illustrative embodiment.
Figure 12:
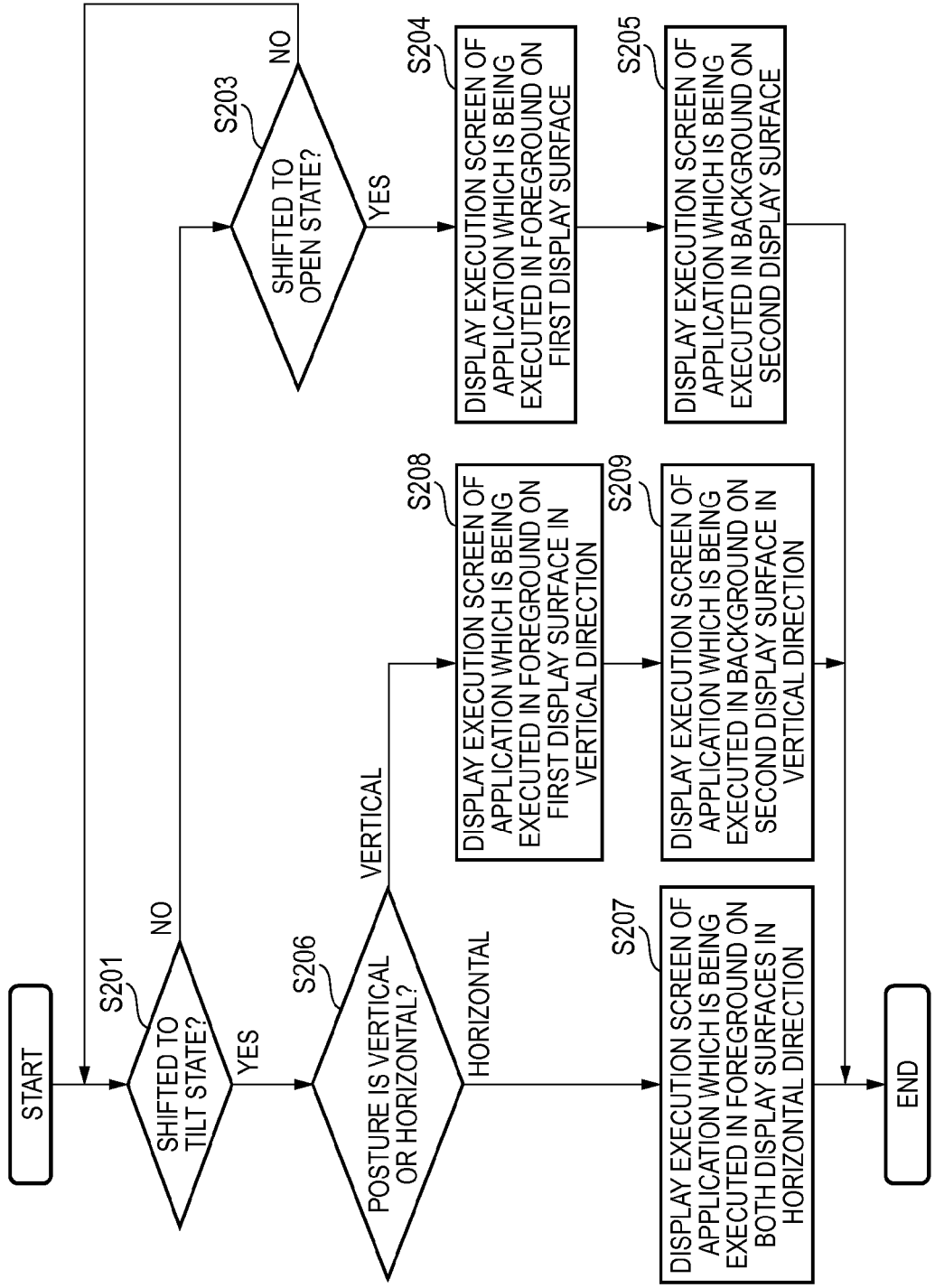
FIG. 12 is a flowchart showing a processing sequence of the display control according to the second modified illustrative embodiment.
Figure 13:
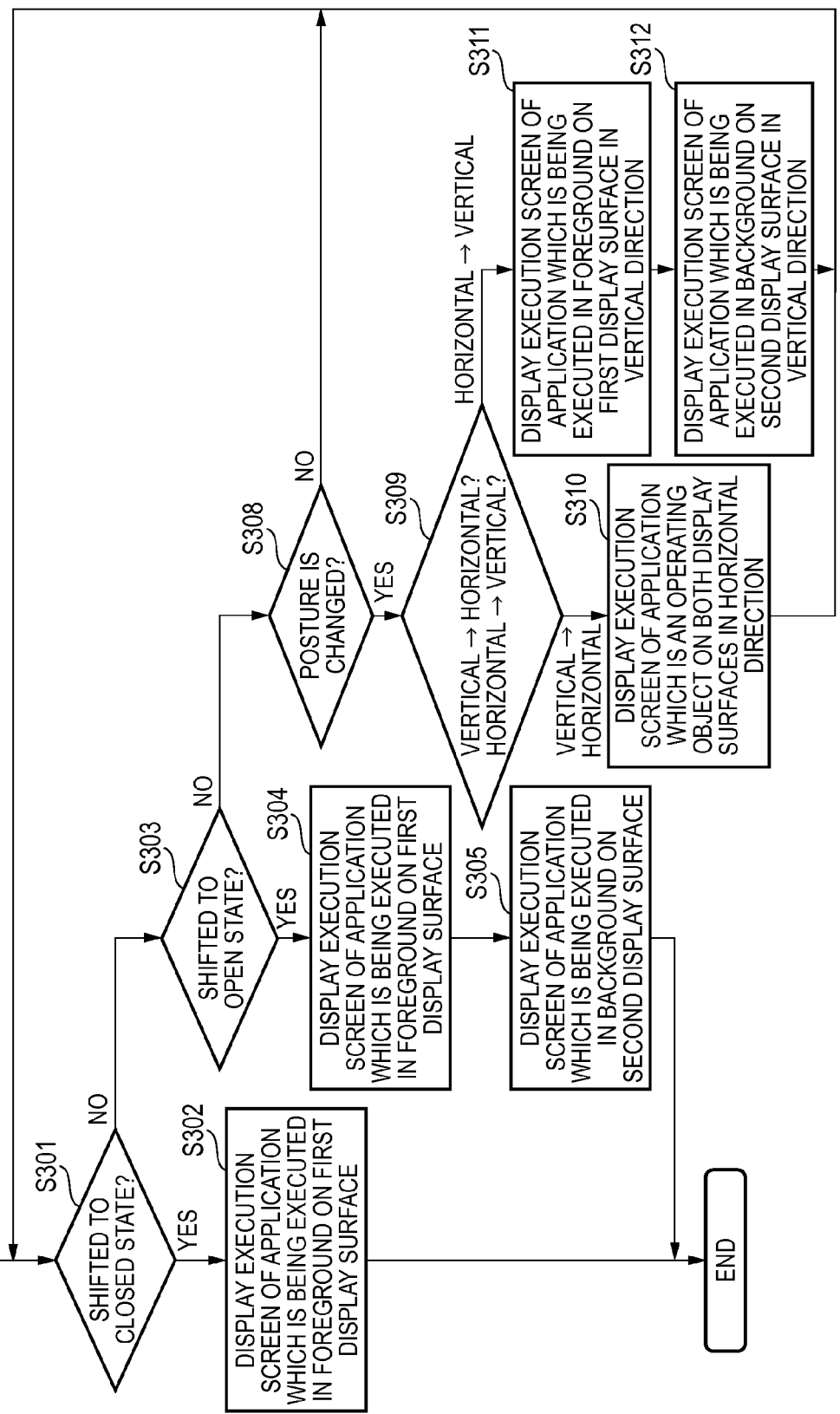
FIG. 13 is a flowchart showing a processing sequence of the display control according to the second modified illustrative embodiment.
Figure 14A:
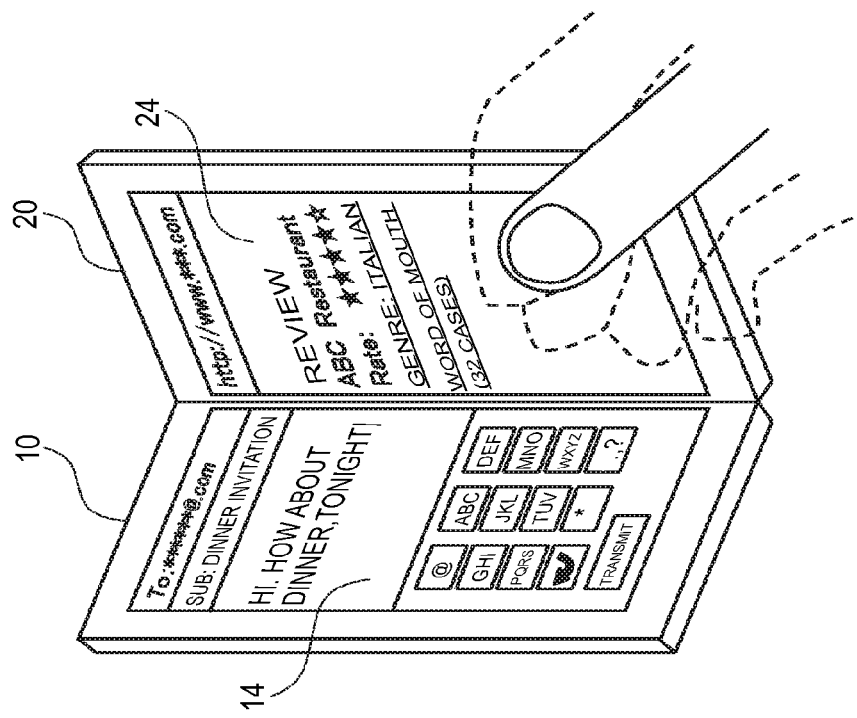
FIGS. 14A and 14B show examples of a screen display when the display controls of FIGS. 11 to 13 are executed.
Figure 14B:
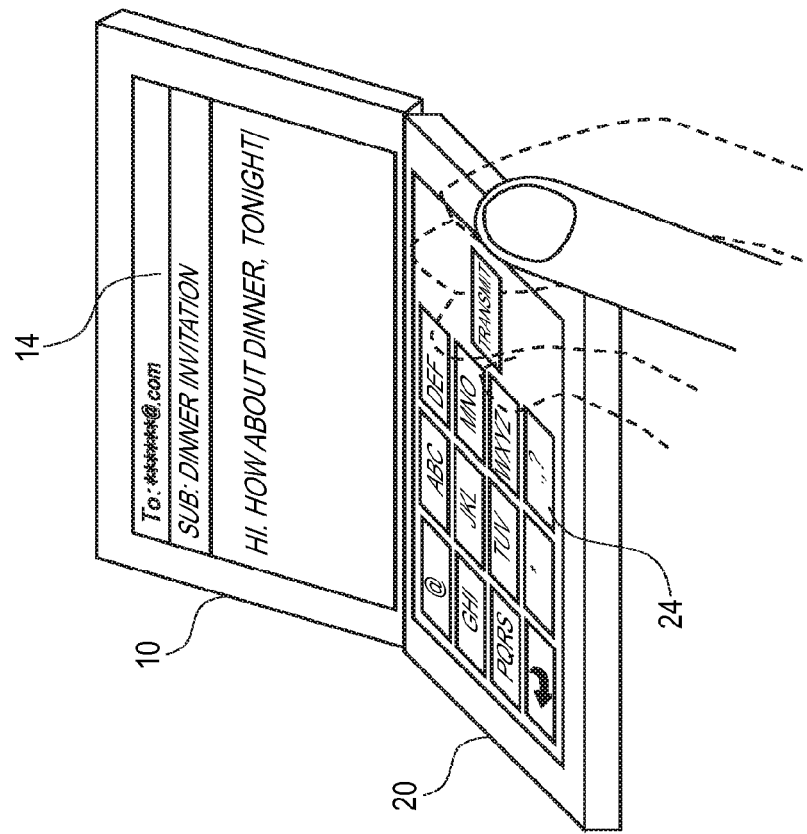

FIGS. 11 to 13 are flowcharts showing processing sequences of display control according to a second modified illustrative embodiment. FIG. 11 is a flowchart showing display control which is performed when the portable telephone is shifted from the open state to the tilt state or closed state during the separate screen display. FIG. 12 is a flowchart showing display control which is performed when the portable telephone is shifted from the closed state to the tilt state or open state. FIG. 13 is a flowchart showing display control which is performed when the portable telephone is shifted from the tilt state to the closed state or open state during the full screen display. FIGS. 14A and 14B show examples of a screen display when the display controls of FIGS. 11 to 13 are executed.

In this modified illustrative embodiment, a direction of the portable telephone 1 is determined and a screen display corresponding to the direction is performed at the tilt state.

In the control processing shown in FIG. 11 of this modified illustrative embodiment, the processing of step S102 in the control processing shown in FIG. 6A is replaced with processing of steps S105 to S107. Also, in the control processing shown in FIG. 12 of this modified illustrative embodiment, the processing of step S202 in the control processing shown in FIG. 6B is replaced with processing of steps S206 to S209. In the control processing shown in FIG. 13 of this modified illustrative embodiment, processing of steps S308 to S312 is added to the control processing shown in FIG. 7. The other processing is the same as that of the illustrative embodiment.

Referring to FIG. 11, when the CPU 100 determines that the arrangement state of the portable telephone 1 is shifted from the open state to the tilt state (S101: YES), the CPU 100 determines a direction of the portable telephone 1 by the acceleration sensor 313. That is, when the portable telephone 1 is held by the user, the CPU 100 determines whether the portable telephone 1 is directed in the horizontal direction (refer to FIG. 14A) or vertical direction (refer to FIG. 14B) (S105).

When the portable telephone 1 is directed in the horizontal direction, the first display surface 14 and the second display surface 24 are arranged in the upper-lower direction. On the other hand, when the portable telephone 1 is directed in the vertical direction, the first display surface 14 and the second display surface 24 are arranged in the left-right direction.

When the CPU 100 determines that the portable telephone 1 is directed in the horizontal direction (S105: horizontal), the CPU 100 displays the execution screen of the application, which is the current operating object, on the first display surface 14 and the second display surface 24 such that the execution screen is directed in the horizontal direction, i.e., such that the width directions of the display surfaces 14, 24 become the upper-lower direction of the execution screen, as shown in FIG. 14A (S106).

On the other hand, when the CPU 100 determines that the portable telephone 1 is directed in the vertical direction (S105: vertical), the CPU 100 displays the execution screen of the application, which is being executed on the first display surface 14, on the first display surface 14 such that the execution screen is directed in the vertical direction, i.e., such that the longitudinal directions of the display surfaces 14, 24 become the upper-lower direction of the execution screen, as shown in FIG. 14B, and displays the execution screen of the application, which is being executed on the second display surface 24, on the second display surface 24 with being vertical (S107).

That is, when the portable telephone 1, which is directed in the horizontal direction at the open state, is shifted to the tilt state and changed to the vertical direction, the directions of the execution screens of the respective display surfaces 14, 24 are changed from the horizontal direction to the vertical direction. In the meantime, when the portable telephone 1 is directed in the vertical direction at the open state, the execution screens are directed in the vertical direction. Therefore, when the portable telephone 1 is shifted to the tilt state while keeping the vertical direction, the display mode is not changed. In any case, the display mode is kept as the separate screen display.

Next, referring to FIG. 12, when the CPU 100 determines that the arrangement state of the portable telephone 1 is shifted from the closed state to the tilt state (S201: YES), the CPU 100 determines the direction of the portable telephone 1 by the acceleration sensor 313 (S206). When it is determined that the portable telephone 1 is directed to the horizontal direction (S206: horizontal), the CPU 100 displays the execution screen of the application, which is being executed in the foreground, on the first display surface 14 and the second display surface 24 to be directed in the horizontal direction (S207), as shown in FIG. 14A.

On the other hand, when it is determined that the portable telephone 1 is directed in the vertical direction (S206: vertical), the CPU 100 displays the execution screen of the application, which is being executed in the foreground, on the first display surface 14, to be directed in the vertical direction (S208), and, at the same time, displays the execution screen of the application, which is being executed in the background, on the second display surface 24, to be directed in the vertical direction (S209), as shown in FIG. 14B.

Next, referring to FIG. 13, the CPU 100 determines whether the portable telephone is shifted from the tilt state to the closed state and to the open state (S301, S303) and monitors whether the direction of the portable telephone 1 is changed, i.e., whether the direction of the portable telephone is changed from the horizontal direction to the vertical direction or from the vertical direction to the horizontal direction (S308, S309).

At the tilt state, when the portable telephone 1 is directed in the vertical direction, the execution screens of the two applications are respectively displayed on the corresponding display surfaces 14, 24 to be directed in the vertical direction (refer to FIG. 14B), as described above. From this state, when the user changes the direction of the portable telephone 1 into the horizontal direction, the CPU 100 determines that the portable telephone 1 is changed from the vertical direction to the horizontal direction (S308: YES, S309: vertical→horizontal) and displays the execution screen of the application, which is the current operating object, on the first display surface 14 and the second display surface 24, to be directed in the horizontal direction (S310; refer to FIG. 14A).

On the other hand, when the portable telephone 1 is directed in the horizontal direction at the tilt state, the execution screen of one application is displayed on both the display surfaces 14, 24, to be directed in the horizontal direction (refer to FIG. 14A). From this state, when the user changes the direction of the portable telephone 1 into the vertical direction, the CPU 100 determines that the direction of the portable telephone 1 is changed from the horizontal direction to the vertical direction (S308: YES, S309: horizontal→vertical) and displays the execution screen of the application which is being executed on both the display surfaces 14, 24, i.e., the application which is being executed in the foreground, on the first display surface 14, to be directed in the vertical direction (S311), and at the same time, displays the execution screen of the application, which is being executed in the background, on the second display surface 24, to be directed in the vertical direction (S312; refer to FIG. 14B).

That is, according to this modified illustrative embodiment, the user can efficiently use the mode where one application is used with the portable telephone 1 being at the tilt state and directed in the horizontal direction and the mode where two applications are used with the portable telephone 1 being at the tilt state and directed in the vertical direction, in accordance with the using scenes of the various applications. Therefore, the user convenience is improved.

<Others>

While the present invention has been shown and described with reference to certain illustrative embodiments thereof, it will be understood by those skilled in the art that various changes in form and details may be made therein without departing from the spirit and scope of the invention as defined by the appended claims.

For example, in the above illustrative embodiment, during the separate screen display at the open state, when the portable telephone is shifted to the tilt state, the display mode is switched into the full screen display. However, the present invention is not limited thereto. For example, during the full screen display at the open state, when the portable telephone is shifted to the tilt state, the display mode may be switched into the separate screen display.

Also, in the above illustrative embodiment, when the portable telephone is shifted from the open state to the tilt state, the execution screen of the application, which is the current operating object, is displayed in the full screen display mode. However, the present invention is not limited thereto. For example, the execution screen of the application, which is being executed on a predetermined display surface at the open state, may be displayed in the full screen display mode. Alternatively, when the portable telephone becomes at the tilt state, a selection screen for selecting an application to be displayed may be displayed and an execution screen of the application selected on the selection screen may be displayed in the full screen display mode.

Also, in the above illustrative embodiment, the mail application and the web browser have been exemplified as the applications. However, the display mode may be switched between the full screen display and the separate screen display on execution screens of other applications such as call application, address book application, moving picture reproducing application and the like.

Also, in the first modified illustrative embodiment, the screen display is switched at the tilt state by the switching icon D2. However, the switching operation is not limited to the operation to the switching icon D2 and any operation is possible. For example, one key of the key groups 16, 26 may be allotted to the switching operation. Also, the switching operation may be received when a predetermined pattern is formed on the display surfaces 14, 24. Also, the switching operation may be received when the portable telephone 1 is operated in a predetermined mode.

Figure 15:
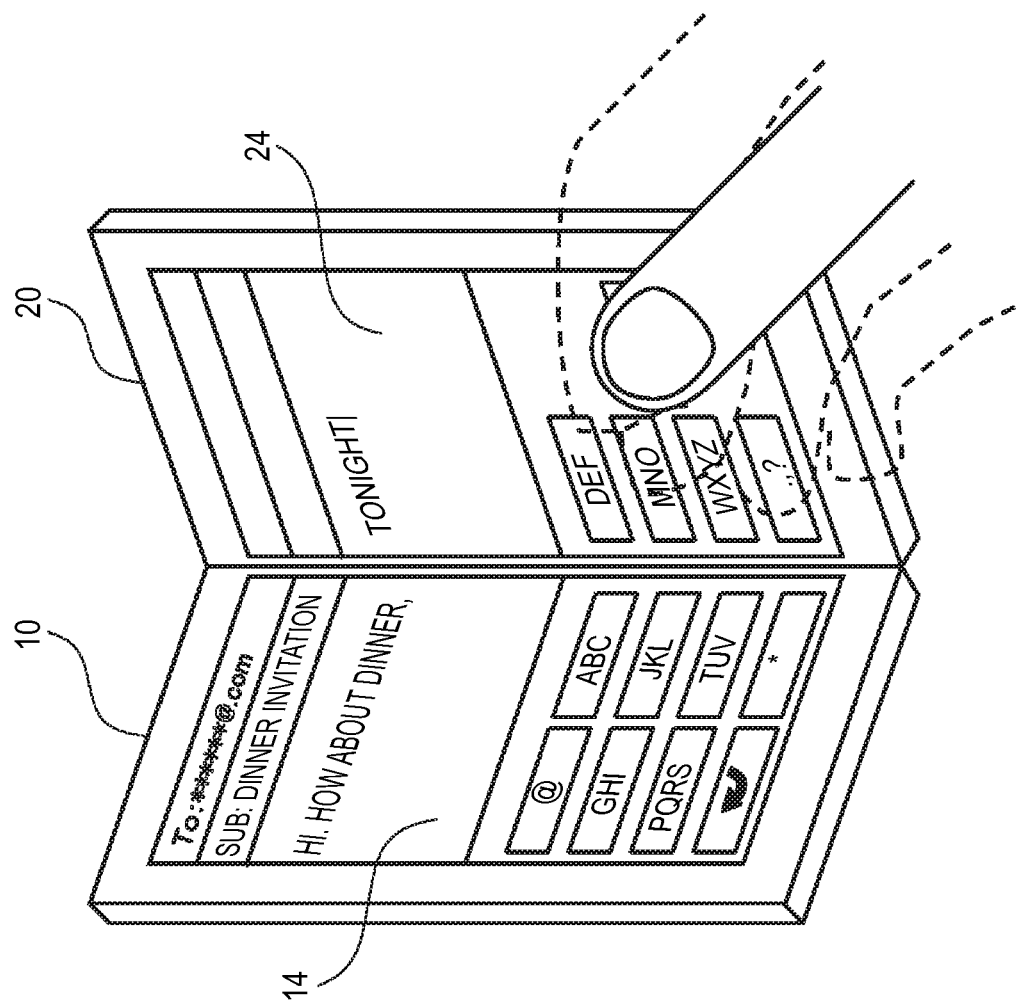
FIG. 15 shows another modified illustrative embodiment.

Also, in the second modified illustrative embodiment, when the portable telephone 1 is at the tilt state and is directed in the vertical direction, the execution screens of the two applications are respectively displayed on the corresponding display surfaces, to be directed in the vertical direction, as shown in FIG. 14B. However, the user may preset which one mode of the display mode shown in FIG. 14B and a display mode shown in FIG. 15 where one application is displayed in the same manner as the case where the portable telephone 1 is directed in the horizontal direction, is used. In this case, when the portable telephone 1 is at the tilt state and is directed in the vertical direction, the displays are performed on both the display surfaces 14, 24 by the display mode (display mode of FIG. 14B or the display mode of FIG. 15) set by the user.

Figure 16B:
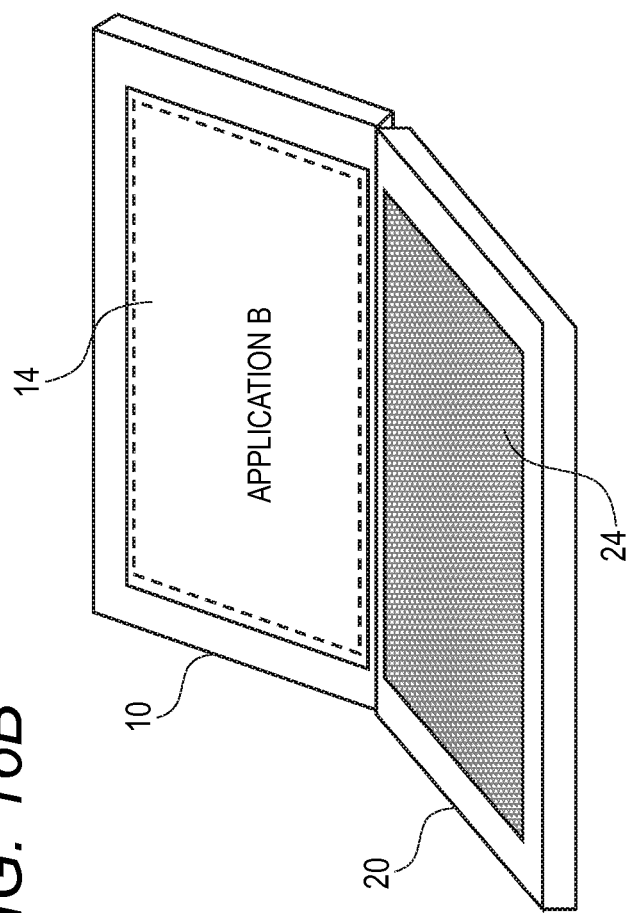
FIGS. 16A to 16C show other modified illustrative embodiments.
Figure 16C:
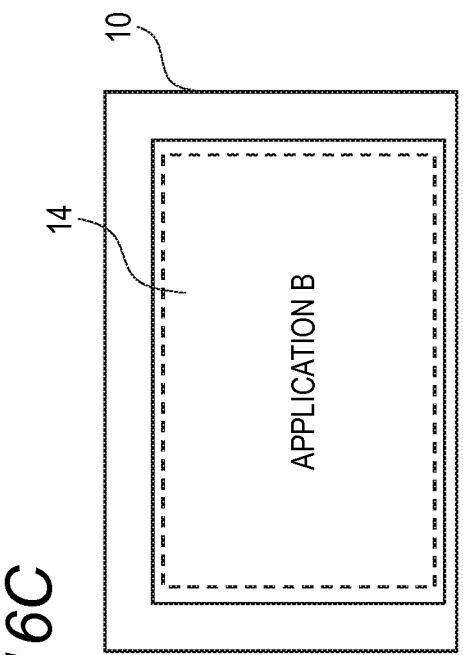
Figure 16A:
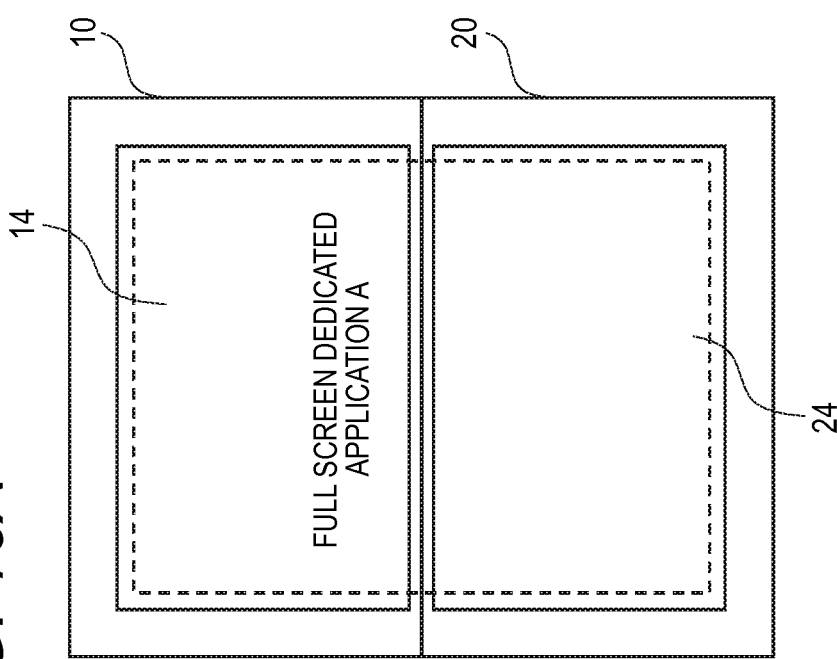

Also, regarding the applications installed in the portable telephone 1, there is an application (hereinafter, referred to as 'full screen dedicated application') in which an execution screen thereof can be displayed only in the full screen display mode. As shown in FIG. 16A, for a case where a full screen dedicated application A is displayed on both the display surfaces 14, 24 and an application B, which is not a full screen dedicated application, is being executed in the background at the open state, when the portable telephone 1 is switched into the tilt state, the CPU 100 displays an execution screen of the application B on any one display surface, for example, on the first display surface 14 and turns off the second display surface 24, as shown in FIG. 16B. Also, when the portable telephone 1 is switched from the tilt state to the closed state, the CPU 100 displays the execution screen of the application B on the first display surface 14, as shown in FIG. 16C. At the tilt state and at the closed state, the full screen dedicated application A is kept executed in the background. In the meantime, even when the portable telephone is switched from the state (FIG. 16A) where the full screen dedicated application A is displayed on both the display surfaces 14, 24 at the open state, to the closed state without being stopped at the tilt state, the CPU 100 displays the execution screen of the application B on the first display surface 14 (FIG. 16C).

To the contrary, as shown in FIG. 16C, for a case where the application B is displayed on the first display surface 14 and the full screen dedicated application A is being executed in the background at the closed state, when the portable telephone 1 is switched into the tilt state, the CPU 100 displays the execution screen of the application B on any one display surface, for example, on the first display surface 14 and turns off the second display surface 24, as shown in FIG. 16B. Also, when the portable telephone 1 is switched from the tilt state to the open state, the CPU 100 displays the execution screen of the full screen dedicated application A on both the display surfaces 14, 24, as shown in FIG. 16A. In the meantime, even when the portable telephone is switched from the state (FIG. 16C) where the application B is displayed on the first display surface 14, to the open state without being stopped at the tilt state, the CPU 100 displays the execution screen of the full screen dedicated application A on both the display surfaces 14, 24 (FIG. 16A).

In the meantime, it may be possible that the second display surface 24 is not turned off and the execution screen of the application B is enlarged and displayed on both the display surfaces 14, 24 at the tilt state.

Also, the portable terminal apparatus is not limited to the portable telephone and may be a PDA (Personal Digital Assistant), a tablet PC and the like.

Also, the illustrative embodiment of the present invention can be appropriately variously changed within the range of the technical spirit defined in the claims.

What is claimed is:

1. A portable terminal apparatus comprising:
a first cabinet having a first display surface;
a second cabinet having a second display surface;
a support mechanism which supports the first cabinet and the second cabinet such that an arrangement state is switchable between a first arrangement state where the first display surface and the second display surface are arranged adjacently and a second arrangement state where the first display surface and the second display surface are arranged to have a relative position therebetween different from that of the first arrangement state;
a direction detection unit which detects a direction of the portable terminal apparatus;
a state detection unit which detects a switching between the first arrangement state and the second arrangement state; and
a control unit which controls display on the first display surface and the second display surface,
wherein the control unit controls a display mode of the first display surface and the second display surface according to the switching between the first arrangement state and the second arrangement state,
wherein the control unit switches the display mode of the first display surface and the second display surface between a first mode where an execution screen of one of two applications is displayed on the first display surface and an execution screen of the other of the two applications is displayed on the second display surface, and a second mode where an execution screen of one application is displayed on the first display surface and the second display surface, according to the switching between the first arrangement state and the second arrangement state, and
wherein when the arrangement state is switched from the first arrangement state into the second arrangement state in the first mode of the display mode, the control unit switches the display mode from the first mode to the second mode when the direction detection unit detects that the direction of the portable terminal apparatus is a first direction in which the first display surface and the second display surface are arranged in an upper-lower direction, and keeps the display mode in the first mode when the direction detection unit detects that the direction of the portable terminal apparatus is a second direction in which the first display surface and the second display surface are arranged in a left-right direction.

2. The portable terminal apparatus according to claim 1, wherein the support mechanism supports the first cabinet and the second cabinet such that the first display surface and the second display surface are arranged to be flush with each other at the first arrangement state and the first display surface and the second display surface are arranged to form a predetermined obtuse angle therebetween at the second arrangement state.

3. The portable terminal apparatus according to claim 1, wherein when the display mode is switched from the first mode into the second mode, the control unit displays an execution screen of an application, which is a current operating object, in the second mode.

4. The portable terminal apparatus according to claim 1, wherein when the arrangement state is switched from the first arrangement state into the second arrangement state in the second mode of the display mode, the control unit switches the display mode from the second mode to the first mode.

5. The portable terminal apparatus according to claim 1, wherein the control unit executes an application, an execution screen of which is not displayed in the second mode, in a background.

6. The portable terminal apparatus according to claim 1, wherein the control unit switches an application, an execution screen of which is displayed in the second mode, between a foreground and a background, based on a predetermined switching operation.

7. The portable terminal apparatus according to claim 1, wherein when the arrangement state is switched from the first arrangement state or the second arrangement state into a third arrangement state, the control unit displays an execution screen of an application, which is a current operating object, on the first display surface.

8. The portable terminal apparatus according to claim 1, wherein the support mechanism supports the first cabinet and the second cabinet such that the arrangement state is switchable from the first arrangement state or the second arrangement state into a third arrangement state where the second cabinet is covered with the first cabinet, wherein when the arrangement state is switched from the third arrangement state into the first arrangement state or the second arrangement state, the control unit displays a keyboard on one of the first display surface and the second display surface, and displays a display area for displaying a character input from the keyboard on the other of the first display surface and the second display surface, and wherein when the arrangement state is switched from the first arrangement state or the second arrangement state, into the third arrangement state, the control unit displays the keyboard on the first display surface with a part of the display area being covered by the keyboard.

9. A non-transitory computer readable storage medium having a computer program stored thereon and readable by a computer of a portable terminal apparatus including a first cabinet having a first display surface, a second cabinet having a second display surface, a support mechanism which supports the first cabinet and the second cabinet such that an arrangement state is switchable between a first arrangement state where the first display surface and the second display surface are arranged adjacently and a second arrangement state where the first display surface and the second display surface are arranged to have a relative position therebetween different from that of the first arrangement state, a direction detection unit which detects a direction of the portable terminal apparatus, and a state detection unit which detects a switching between the first arrangement state and the second arrangement state, the computer program, when executed by the computer, causing the computer to perform operations comprising:

controlling a display mode of the first display surface and the second display surface according to the switching between the first arrangement state and the second arrangement state, and switching the display mode of the first display surface and the second display surface between a first mode where an execution screen of one of two applications is displayed on the first display surface and an execution screen of the other of the two applications is displayed on the second display surface, and a second mode where an execution screen of one application is displayed on the first display surface and the second display surface, according to the switching between the first arrangement state and the second arrangement state, wherein when the arrangement state is switched from the first arrangement state into the second arrangement state in the first mode of the display mode, switching the display mode from the first mode to the second mode when the direction detection unit detects that the direction of the portable terminal apparatus is a first direction in which the first display surface and the second display surface are arranged in an upper-lower direction, and keeping the display mode in the first mode when the direction detection unit detects that the direction of the portable terminal apparatus is a second direction in which the first display surface and the second display surface are arranged in a left-right direction.

10. The non-transitory computer readable storage medium according to claim 9, wherein the controlling includes switching the display mode of the first display surface and the second display surface between a first mode where an execution screen of one of two applications is displayed on the first display surface and an execution screen of the other of the two applications is displayed on the second display surface, and a second mode where an execution screen of one application is displayed on the first display surface and the second display surface, according to the switching between the first arrangement state and the second arrangement state.

11. The non-transitory computer readable storage medium according to claim 9, wherein the support mechanism supports the first cabinet and the second cabinet such that the arrangement state is switchable from the first arrangement state or the second arrangement state into a third arrangement state where the second cabinet is covered with the first cabinet, wherein when the arrangement state is switched from the third arrangement state into the first arrangement state or the second arrangement state, the control unit displays a keyboard on one of the first display surface and the second display surface, and displays a display area for displaying a character input from the keyboard on the other of the first display surface and the second display surface, and wherein the operations further include:
when the arrangement state is switched from the first arrangement state or the second arrangement state, into the third arrangement state, displaying the keyboard on the first display surface with a part of the display area being covered by the keyboard.

12. A method for controlling a portable terminal apparatus including a first cabinet having a first display surface, a second cabinet having a second display surface, a support mechanism which supports the first cabinet and the second cabinet such that an arrangement state is switchable between a first arrangement state where the first display surface and the second display surface are arranged adjacently and a second arrangement state where the first display surface and the second display surface are arranged to have a relative position therebetween different from that of the first arrangement state, a direction detection unit which detects a direction of the portable terminal apparatus, and a state detection unit which detects a switching between the first arrangement state and the second arrangement state, the method comprising:

controlling a display mode of the first display surface and the second display surface according to the switching between the first arrangement state and the second arrangement state, and switching the display mode of the first display surface and the second display surface between a first mode where an execution screen of one of two applications is displayed on the first display surface and an execution screen of the other of the two applications is displayed on the second display surface, and a second mode where an execution screen of one application is displayed on the first display surface and the second display surface, according to the switching between the first arrangement state and the second arrangement state, wherein when the arrangement state is switched from the first arrangement state into the second arrangement state in the first mode of the display mode, switching the display mode from the first mode to the second mode when the direction detection unit detects that the direction of the portable terminal apparatus is a first direction in which the first display surface and the second display surface are arranged in an upper-lower direction, and keeping the display mode in the first mode when the direction detection unit detects that the direction of the portable terminal apparatus is a second direction in which the first display surface and the second display surface are arranged in a left-right direction.

13. The method according to claim 12, wherein the controlling includes switching the display mode of the first display surface and the second display surface between a first mode where an execution screen of one of two applications is displayed on the first display surface and an execution screen of the other of the two applications is displayed on the second display surface, and a second mode where an execution screen of one application is displayed on the first display surface and the second display surface, according to the switching between the first arrangement state and the second arrangement state.

14. The method according to claim 12, wherein the support mechanism supports the first cabinet and the second cabinet such that the arrangement state is switchable from the first arrangement state or the second arrangement state into a third arrangement state where the second cabinet is covered with the first cabinet, wherein when the arrangement state is switched from the third arrangement state into the first arrangement state or the second arrangement state, the control unit displays a keyboard on one of the first display surface and the second display surface, and displays a display area for displaying a character input from the keyboard on the other of the first display surface and the second display surface, and wherein the method further includes:
when the arrangement state is switched from the first arrangement state or the second arrangement state, into the third arrangement state, displaying the keyboard on the first display surface with a part of the display area being covered by the keyboard.

15. A portable terminal apparatus comprising:
a first cabinet having a first display surface;
a second cabinet having a second display surface;
a support mechanism which supports the first cabinet and the second cabinet such that an arrangement state is switchable between a first arrangement state where the first display surface and the second display surface are arranged adjacently and a third arrangement state where the second cabinet is covered with the first cabinet;
a state detection unit which detects a switching between the first arrangement state and the third arrangement state;
a direction detection unit which detects a direction of the portable terminal apparatus;
a control unit which controls display on the first display surface and the second display surface,
wherein when the arrangement state is switched from the third arrangement state into the first arrangement state, the control unit displays a keyboard on one of the first display surface and the second display surface, and displays a display area for displaying a character input from the keyboard on the other of the first display surface and the second display surface, and
wherein when the arrangement state is switched from the first arrangement state into the third arrangement state, the control unit displays the keyboard on the first display surface with a part of the display area being covered by the keyboard,
wherein the control unit switches the display mode of the first display surface and the second display surface between a first mode where an execution screen of one of two applications is displayed on the first display surface and an execution screen of the other of the two applications is displayed on the second display surface, and a second mode where an execution screen of one application is displayed on the first display surface and the second display surface, according to the switching between the first arrangement state and a second arrangement state where the first display surface and the second display surface are arranged to have a relative position therebetween different from that of the first arrangement state, and
wherein when the arrangement state is switched from the first arrangement state into the second arrangement state in the first mode of the display mode, the control unit switches the display mode from the first mode to the second mode when the direction detection unit detects that the direction of the portable terminal apparatus is a first direction in which the first display surface and the second display surface are arranged in an upper-lower direction, and keeps the display mode in the first mode when the direction detection unit detects that the direction of the portable terminal apparatus is a second direction in which the first display surface and the second display surface are arranged in a left-right direction.

* * * * *